United States Patent
Ali et al.

(10) Patent No.: US 12,506,641 B2
(45) Date of Patent: Dec. 23, 2025

(54) CELL QUALITY MEASUREMENTS FOR CELLULAR IOT SYSTEMS

(71) Applicant: STMicroelectronics International N.V., Geneva (CH)

(72) Inventors: Abdelmohsen Ali, Kanata (CA); Mohammed Ashraf, Cairo (EG); Elsayed Ahmed, Mission Viejo, CA (US)

(73) Assignee: STMicroelectronics International N.V., Geneva (CH)

( * ) Notice: Subject to any disclaimer, the term of this patent is extended or adjusted under 35 U.S.C. 154(b) by 311 days.

(21) Appl. No.: 18/085,265

(22) Filed: Dec. 20, 2022

(65) Prior Publication Data

US 2024/0205052 A1   Jun. 20, 2024

(51) Int. Cl.
*H04B 17/336* (2015.01)
*H04B 17/327* (2015.01)
*H04L 25/02* (2006.01)

(52) U.S. Cl.
CPC ....... *H04L 25/0204* (2013.01); *H04B 17/327* (2015.01); *H04B 17/336* (2015.01)

(58) Field of Classification Search
CPC ... H04B 17/327; H04B 17/336; H04L 25/025; H04L 25/0204; H04L 25/0228; H04W 24/10; H04W 76/16; H04W 76/27
USPC .......................... 370/203, 329; 375/260, 340
See application file for complete search history.

(56) References Cited

U.S. PATENT DOCUMENTS

| 2017/0359765 A1* | 12/2017 | Chincholi | H04W 24/10 |
| 2019/0327784 A1* | 10/2019 | Tarimala | H04W 76/27 |

FOREIGN PATENT DOCUMENTS

| CN | 110191071 A * | 8/2019 | H04L 25/025 |
| WO | WO 2017/138869 A1 | 8/2017 | |

OTHER PUBLICATIONS

CN110191071_Machine Translation (Year: 2019).*
Communication Pursuant to Article 94(3) EPC, for European Application No. 23217031.6, dated Dec. 12, 2024, 7 pages, European Patent Office, Netherlands.
Qi, et al., "On the Physical Layer Design for Low Cost Machine Type Communication in 3GPP LTE", IEEE, Sep. 14, 2014, (5 pages).
EP 23217031.6 Extended European Search Report mailed May 10, 2024.

* cited by examiner

*Primary Examiner* — Harun Chowdhury
(74) *Attorney, Agent, or Firm* — Alston & Bird LLP

(57) ABSTRACT

Systems, apparatuses, methods, and computer products for cell quality measurements of for cellular internet of things (IOT) systems provided, including for cellular narrow-band IOT (NBIOT) systems and machine type communication (MTC) systems. For example, an IOT device may determine these cell quality measurements to select a serving cell to use for connecting to a cellular network. The cell quality measurements may include channel estimation that is used to generate an RSRP, RSRQ, and Noise Variance estimation. In various embodiments, and based on the cell quality measurements, an IOT device may rank a plurality of cells and select a top ranked cell for providing cellular service.

20 Claims, 12 Drawing Sheets

CELL QUALITY MEASUREMENTS FOR CELLULAR IOT SYSTEMS

TECHNOLOGICAL FIELD

Example embodiments of the present disclosure relate generally to cell quality measurements for cellular internet of things (IOT) systems, and more particularly to cell quality measurements in cellular narrow-band IOT (NBIOT) systems and machine type communication (MTC) systems.

BACKGROUND

In cellular IOT devices, the UE relies on measured cell quality to establish proper connection with the cellular network. In an NBIOT network and/or MTC network, a User Equipment (UE) may camp on a first serving cell which satisfies S-criterion as a top ranked cell. This first serving cell may be one of a plurality of serving cells in the cellular network, such as an LTE or 5G network. Other service cells aside from the first serving cell may be referred to as neighbor cells or neighboring cells. The S-criterion to be satisfied requires information about the Reference Signal Received Power (RSRP) and the Reference Signal Received Quality (RSRQ) for a cell. The RSRP defines a coverage level of the cell on which the serving cell can offer healthy message exchange between the UE and the network. Due to the physical communication channel dynamics, the UE monitors the cell quality of the serving cell while measuring the cell quality of the neighbor cells. Cell quality measurements are used to determine the coverage level for the link between the cell and the UE. Cell quality measurements are also used to select a top ranked cell among other cells in the coverage area covering the UE. Accuracy of the cell quality measurements, in some examples, drives UE performance. A potential reselection process might be executed if a neighbor cell is marked as a higher ranked cell than the serving cell.

Modem design of cellular IOT devices complying with 3GPP NBIOT and MTC specifications utilize cell quality measurements that have been found to be impaired during operation. For example, operating environments including cellular IOT systems include a vast spectrum of channel conditions ranging from slow to fast fading channels with delay spreads up to 8.33 microseconds. Additionally, cellular IOT devices are further expected to operate under extended coverage scenarios where the signal to interference plus noise ratio (SINR) ranges down to −15 dB. Further, the existence of impairments such as frequency offset and timing offsets greatly impact, in some examples, the quality of the received signal and thus the measurements accuracy. Additional example challenges for these IOT networks may be described herein. Challenges in these operating environments impose restrictions on the cell quality measurements to be able to maintain very good measurements of cell quality.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

Various embodiments described herein relate to systems, apparatuses, and methods for cell quality measurements for cellular IOT systems.

In accordance with some embodiments of the present disclosure, an example user equipment is provided. In some embodiments, the example user equipment may comprise an antenna and a modem for a cellular IOT network. The modem may be configured to: receive, at the modem from the antenna, a first cellular signal from a first cell of one or more cells; convert, at the modem, the first cellular signal to a first frequency domain signal; generate, based on the first frequency domain signal, a first channel estimation and a first RSSI, wherein generating the first channel estimation is based on a least squares estimation, a smoothing channel filter, and a time-domain average; and determine, based on the first channel estimation, a first noise variance, a first RSRP, a first RSRQ, and a first SINR.

In some embodiments, the modem is further configured: select the first cell based on the first RSRP, the first RSRQ, and the first SINR.

In some embodiments, the modem, to generate the first channel estimation based on the least squares estimation, the smoothing channel filter, and the time-domain average, is further configured to: determine the least squares estimation based on the first frequency domain signal; apply the smoothing channel filter to the least squares estimation to generate a smoothed least squares estimation; and time-domain average the smoothed least squares estimation to generate the first channel estimation.

In some embodiments, the modem, to determine, based on the first channel estimation, the first noise variance, the first RSRP, the first RSRQ, and the first SINR, is further configured to: determine, based on the first channel estimation and the first frequency domain signal, the first noise variance; determine, based on the first channel estimation, the first RSRP; determine, based on the first RSSI and the first RSRP, the first RSRQ; and determine, based on the first noise variance and the first RSRP, the first SINR.

In some embodiments, the modem is further configured to: receive, at the modem from the antenna, a second cellular signal from a second cell; convert, at the modem, the second cellular signal from the second cell to a second frequency domain signal; determine, based on the second frequency domain signal, a second channel estimation and a second RSSI; determine, based on the second frequency domain signal and the second channel estimation, a second noise variance; determine, based on the second channel estimation, a second RSRP; determine, based on the second RSSI and the second RSRP, a second RSRQ; and determine, based on the second noise variance and the second RSRP, a second SINR.

In some embodiments, the modem is further configured to: perform a cell reselection process based on the first RSRP, the first RSRQ, the first SINR, the second RSRP, the second RSRQ, and the second SINR.

In some embodiments, the modem, to perform a cell reselection process, is further configured to: rank the first cell and second cell based on the first RSRP, the first RSRQ, the first SINR, the second RSRP, the second RSRQ, and the second SINR; and select a highest rank cell of the first cell and the second cell.

In some embodiments, the modem, to apply a smoothing channel filter to the least squares estimation, is further configured to: segment the least squares estimation into a plurality of segments; and apply the smoothing channel filter to each segment of the plurality of segments.

In some embodiments, the modem may be a NBIOT modem.

In some embodiments, the modem may be a MTC modem.

In accordance with some embodiments of the present disclosure, an example method is provided. The method may comprise: receiving, at a modem, a first cellular signal from a first cell of one or more cells; converting, at the modem, the first cellular signal from the first cell to a first frequency domain signal; generating, based on the first frequency domain signal, a first channel estimation and a first RSSI, wherein generating the first channel estimation is based on a least squares estimation, a smoothing channel filter, and a time-domain average; and determining, based on the first channel estimation, a first noise variance, a first RSRP, a first RSRQ, and a first SINR.

In some embodiments, the method may further comprise selecting the first cell based on the first RSRP, the first RSRQ, and the first SINR.

In some embodiments, generating, based on the first frequency domain signal, a first channel estimation and a first RSSI, wherein determining the first channel estimation is based on a least squares estimation, a smoothing channel filter, and a time-domain average may comprise: determining a least squares estimation based on the first frequency domain signal; applying a smoothing channel filter to the least squares estimation to generate a smoothed least squares estimation; and time-domain averaging the smoothed least squares estimation to generate the first channel estimation.

In some embodiments, determining, based on the first channel estimate, the first noise variance, the first RSRP, the first RSRQ, and the first SINR may comprise: determining, based on the first channel estimation and the first frequency domain signal, the first noise variance; determining, based on the first channel estimation, the first RSRP; determining, based on the first RSSI and the first RSRP, the first RSRQ; and determining, based on the first noise variance and the first RSRP, the first SINR.

In some embodiments, the method may further comprise: receiving, at the modem, a second cellular signal from a second cell; converting, at the modem, the second cellular signal from the second cell to a second frequency domain signal; determining, based on the second frequency domain signal, a second channel estimation and a second RSSI; determining, based on the second frequency domain signal and the second channel estimation, a second noise variance; determining, based on the second channel estimation, a second RSRP; determining, based on the second RSSI and the second RSRP, a second RSRQ; and determining, based on the second noise variance and the second RSRP, a second SINR.

In some embodiments, the method may further comprise performing a cell reselection process based on the first RSRP, the first RSRQ, the first SINR, the second RSRP, the second RSRQ, and the second SINR.

In some embodiments, performing the cell reselection process may comprise: ranking the first cell and second cell based on the first RSRP, the first RSRQ, the first SINR, the second RSRP, the second RSRQ, and the second SINR; and selecting a highest rank cell of the first cell and the second cell.

In some embodiments, applying a smoothing channel filter to the least squares estimation may comprise: segmenting the least squares estimation into a plurality of segments; and applying the smoothing channel filter to each segment of the plurality of segments.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF SUMMARY OF THE DRAWINGS

Figure 1:
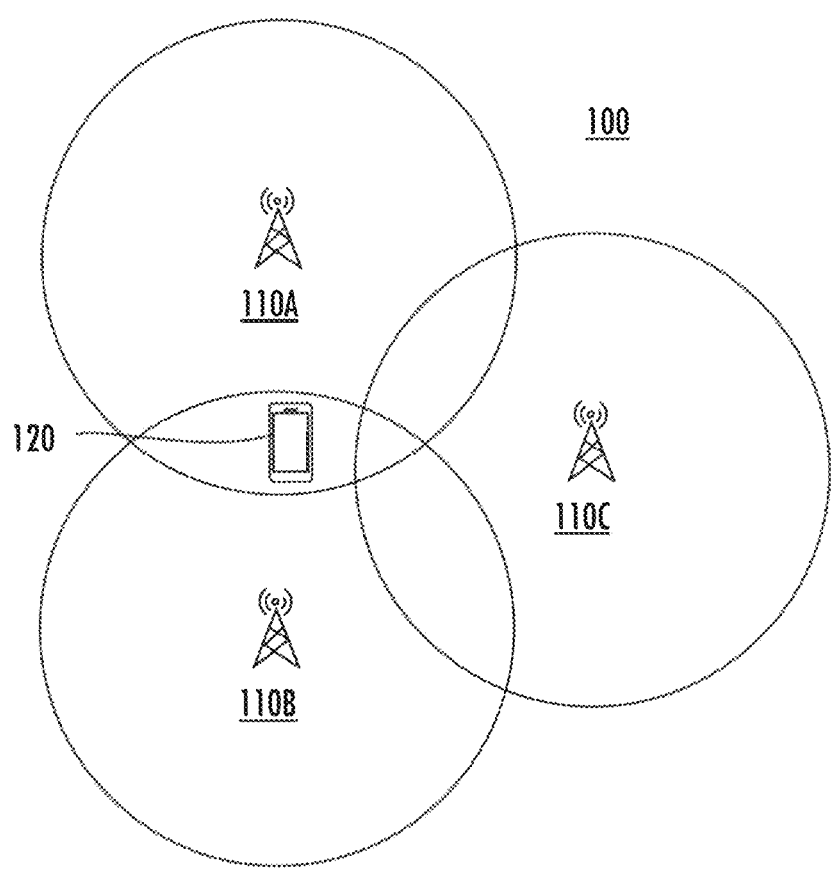
Figure 2:
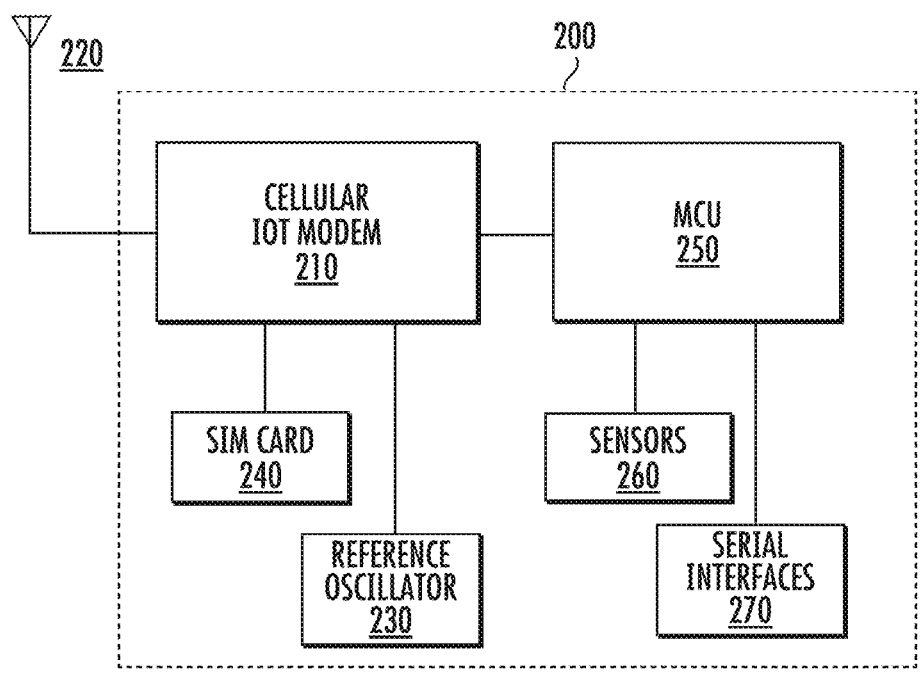
Figure 3:
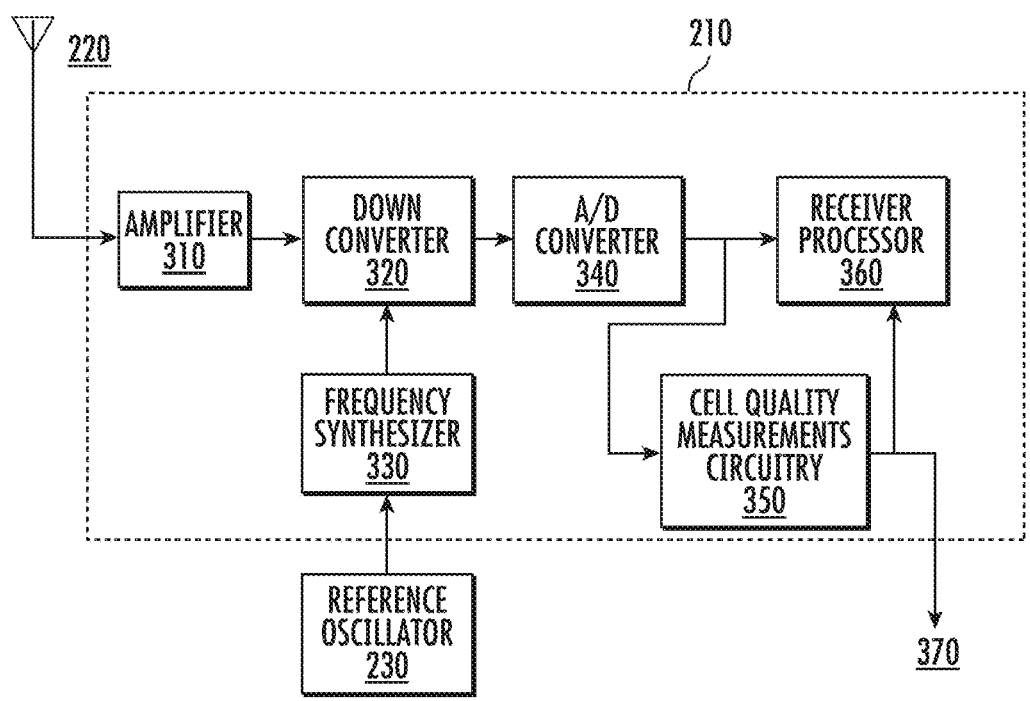
Figures 4A, 4B:
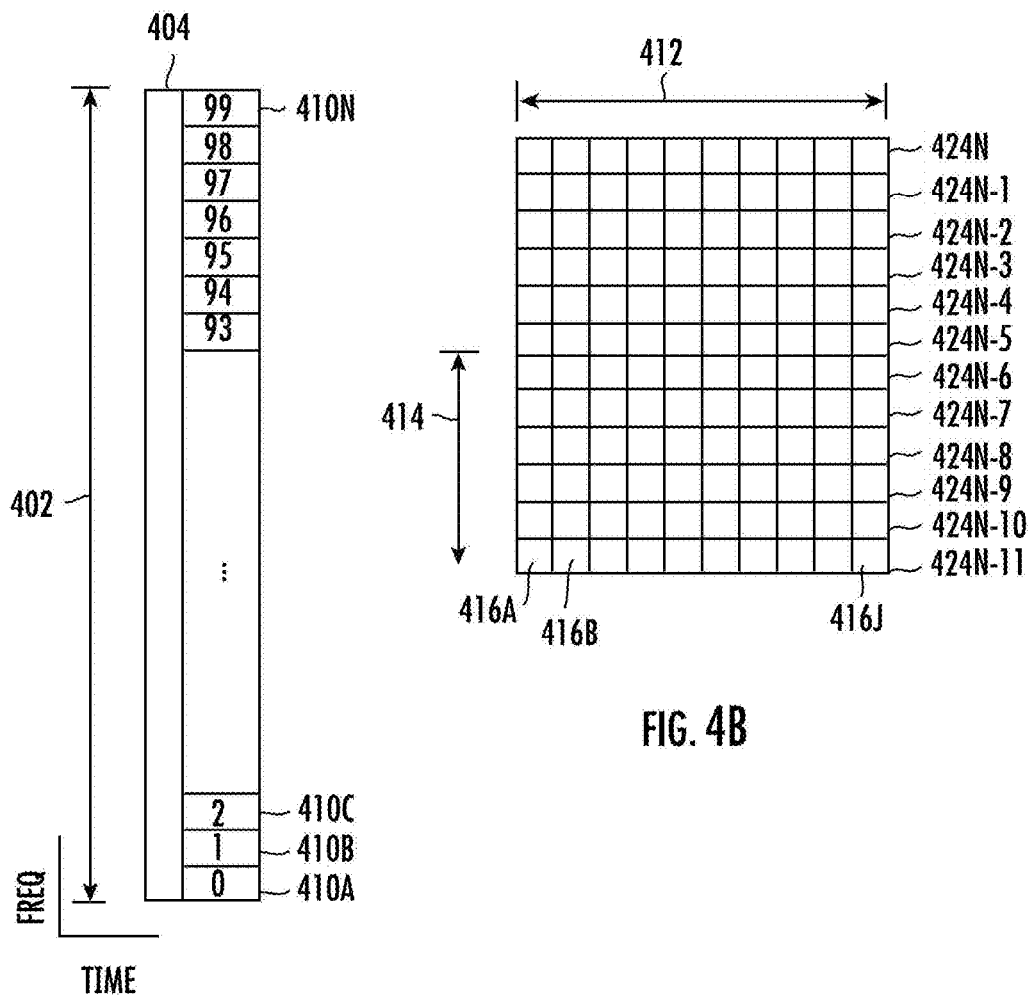
Figure 4C:
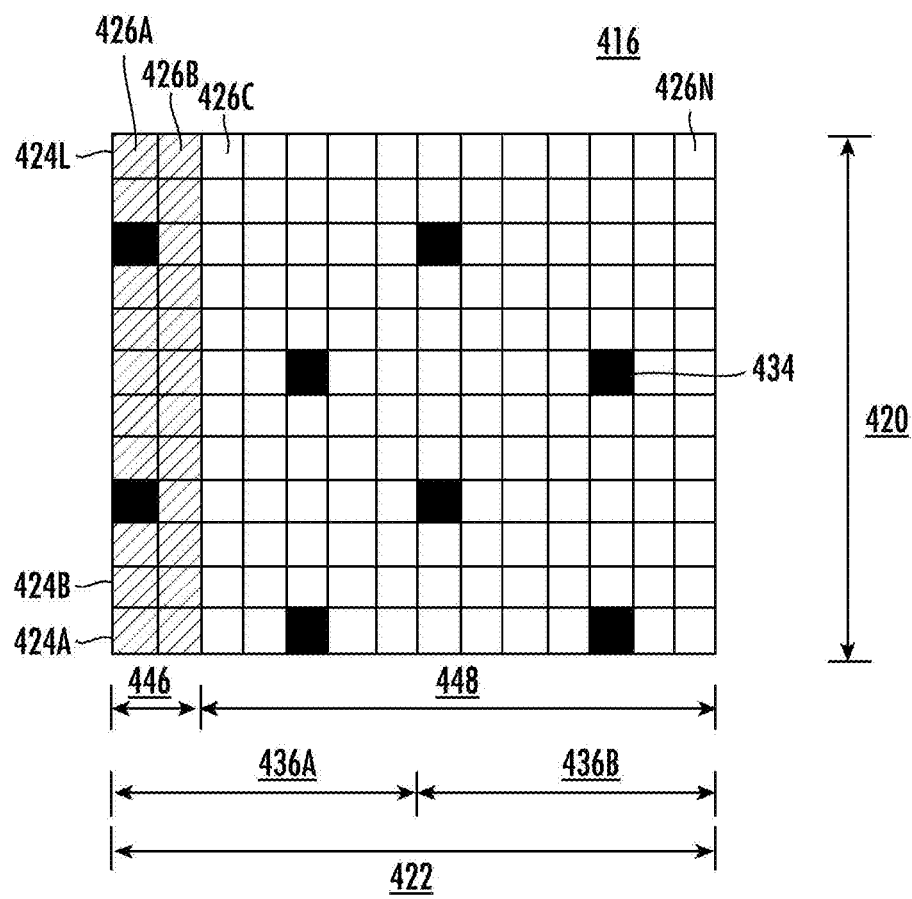
Figure 5:
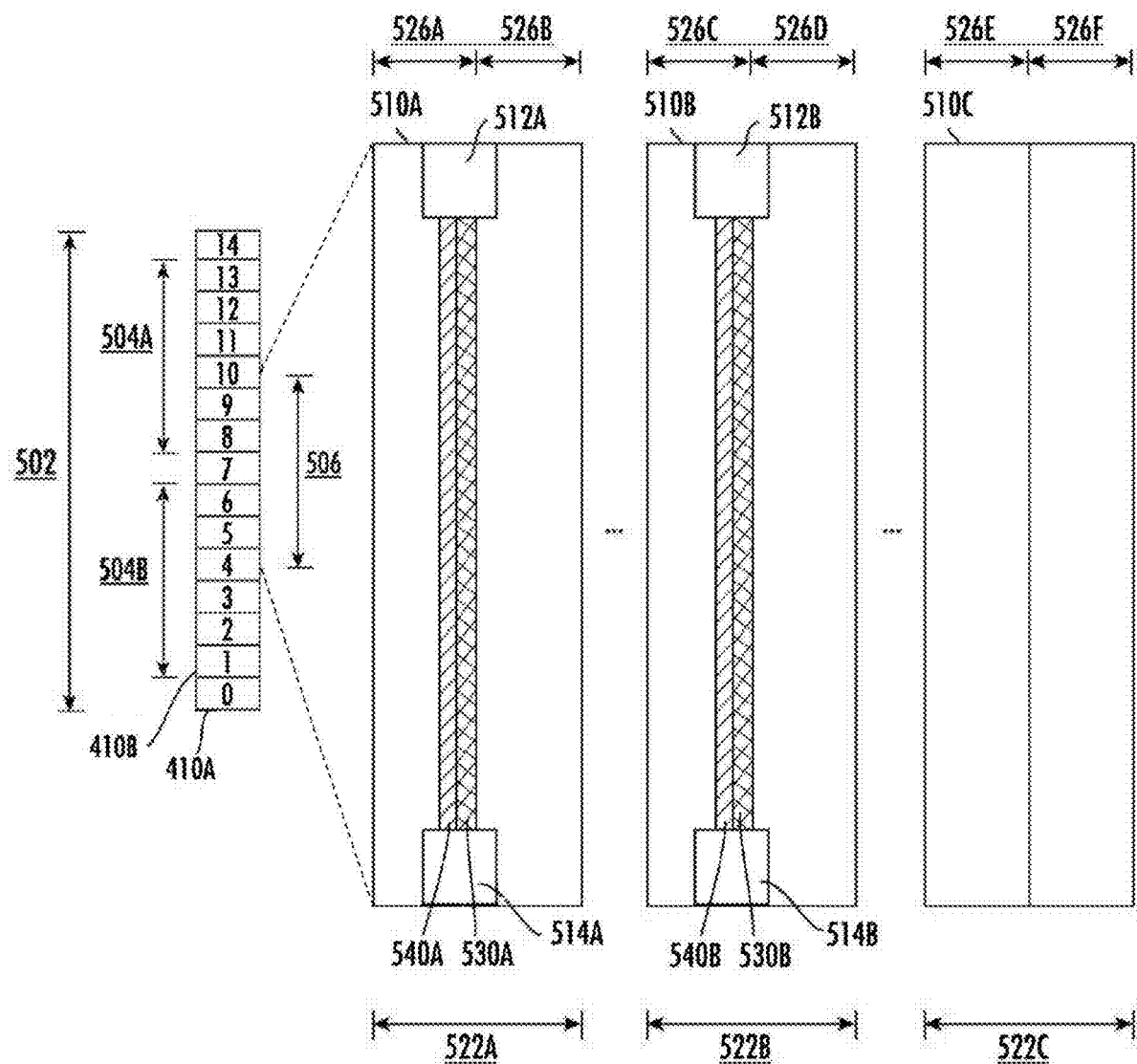
Figure 6:
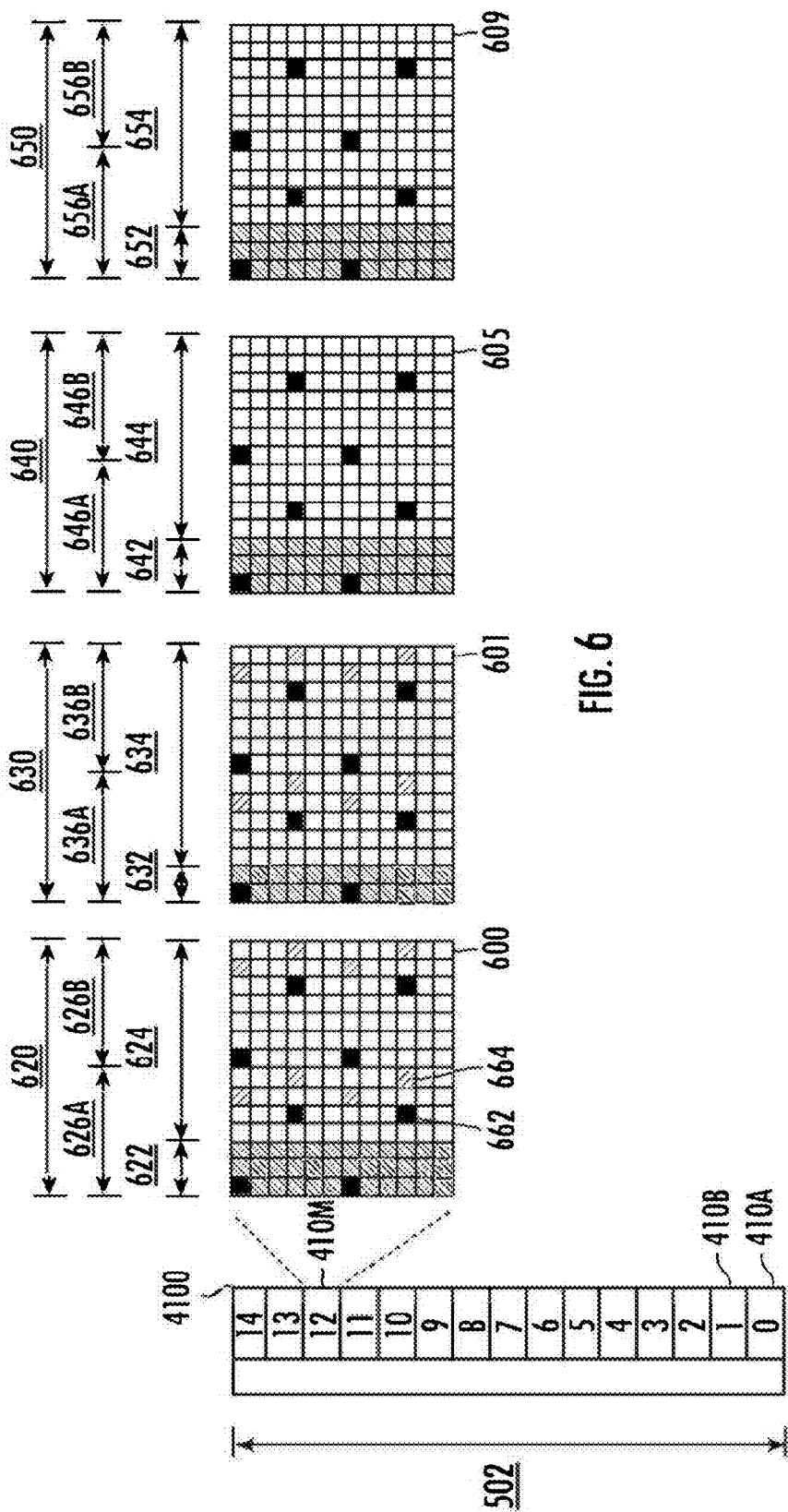
Figure 7:
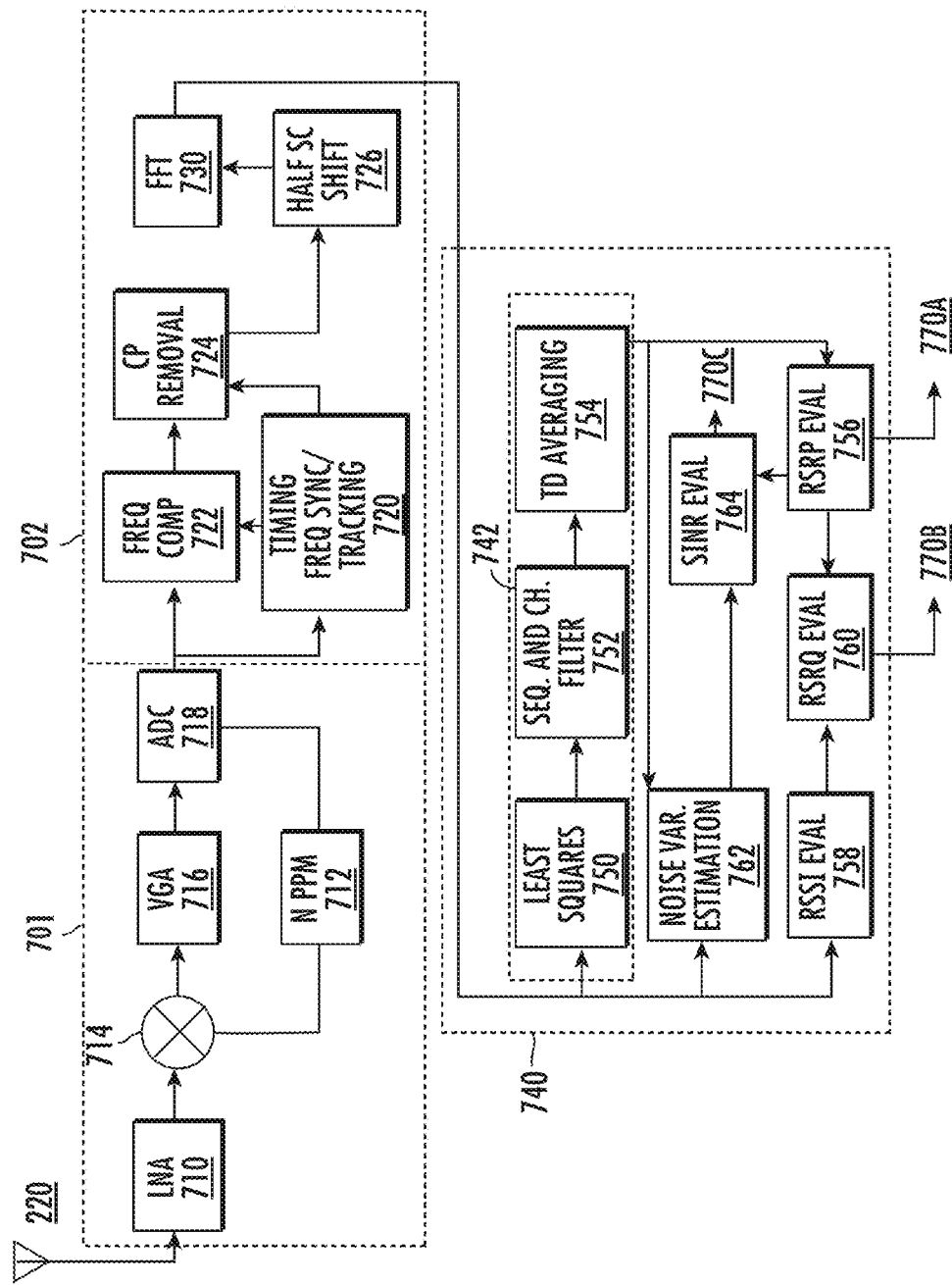
Figure 8:
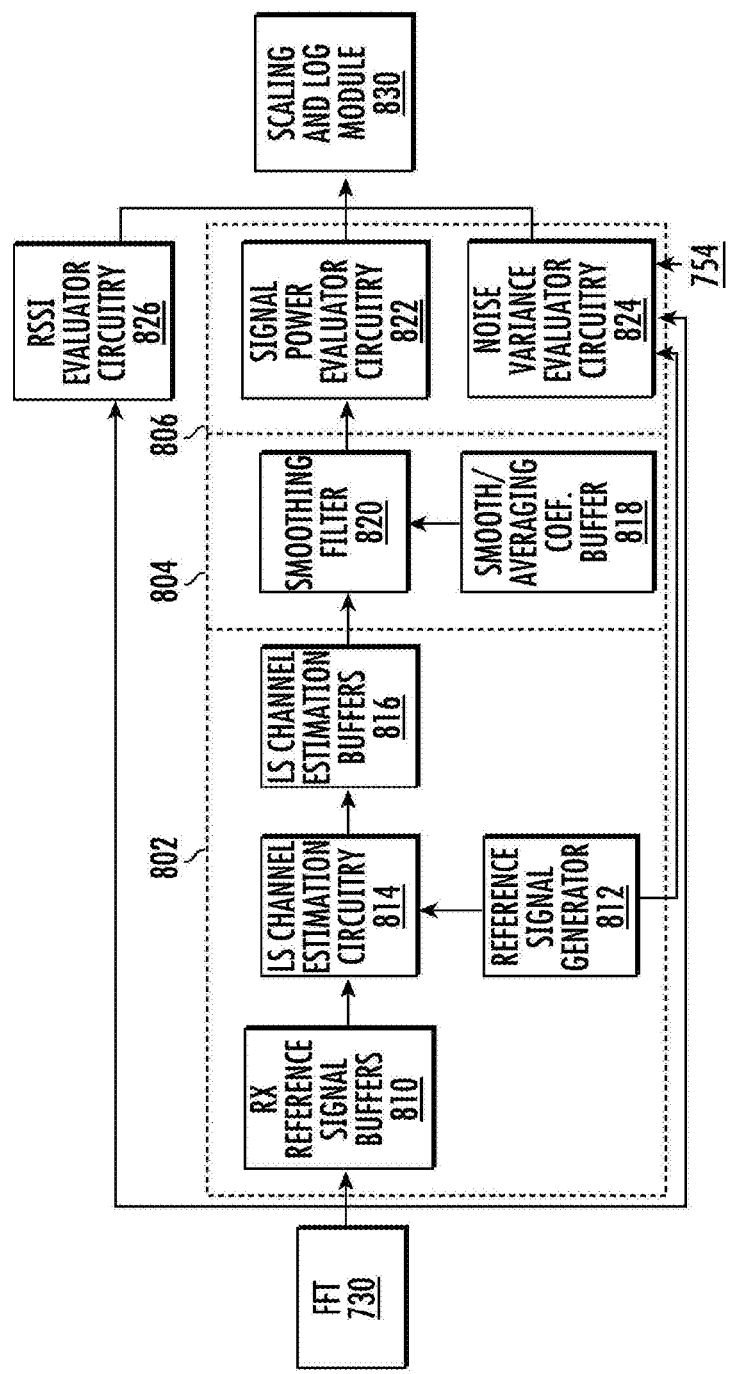
Figure 9:
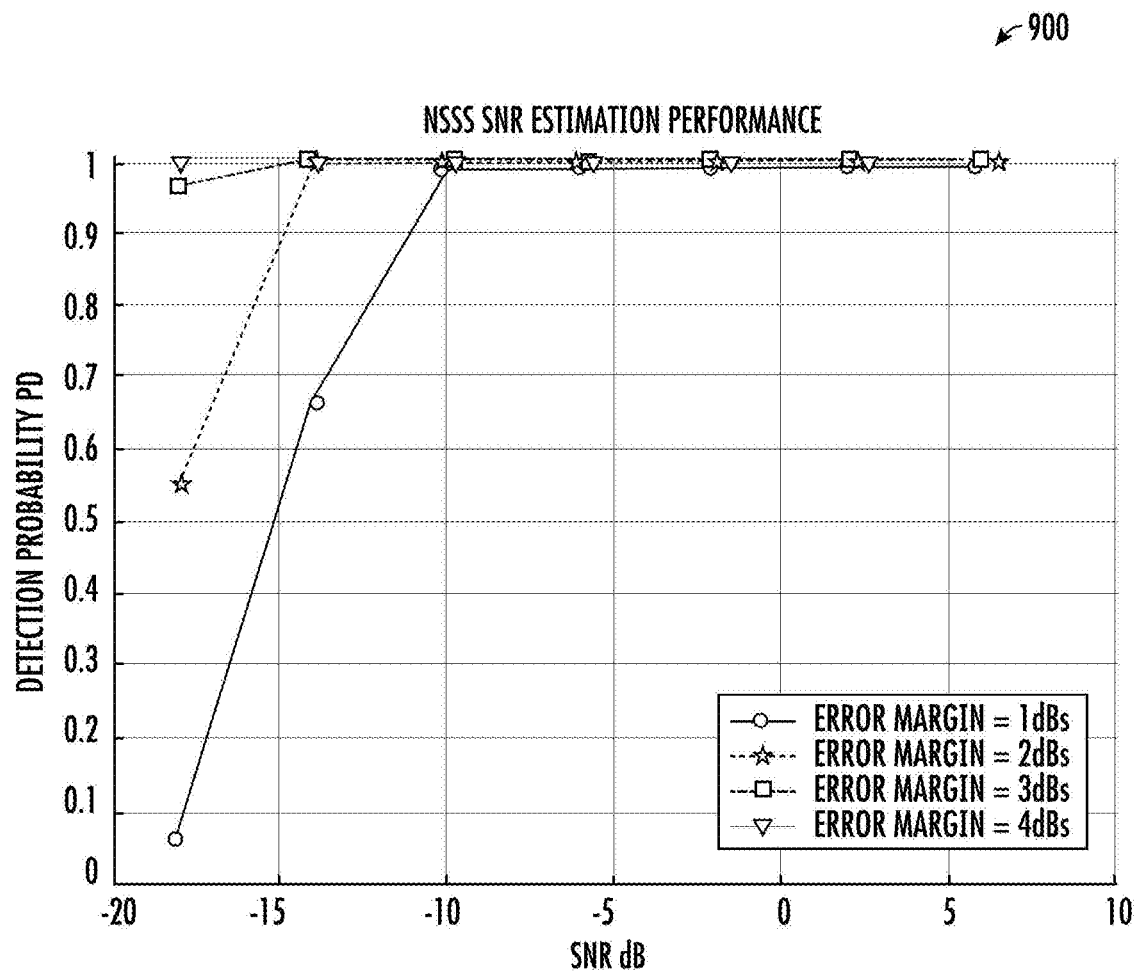
Figure 10:
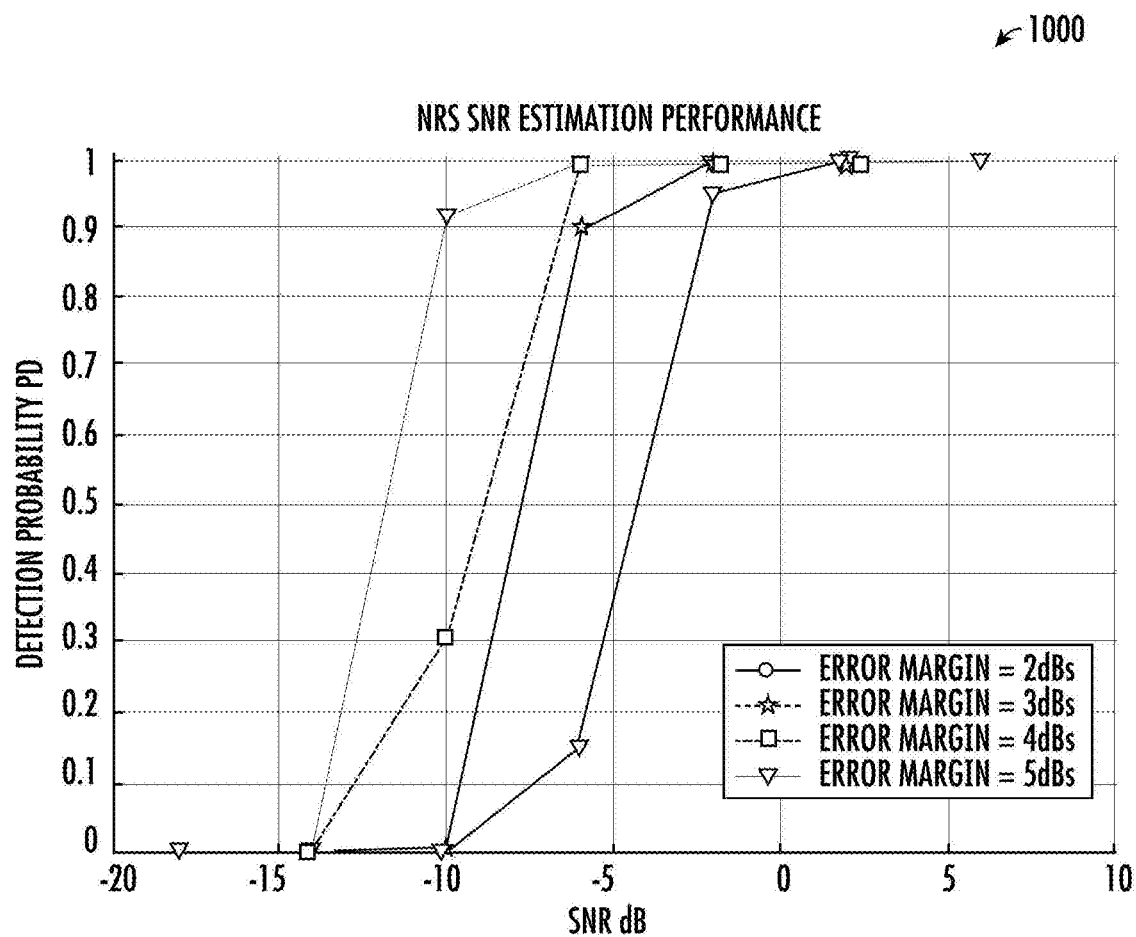
Figure 11:
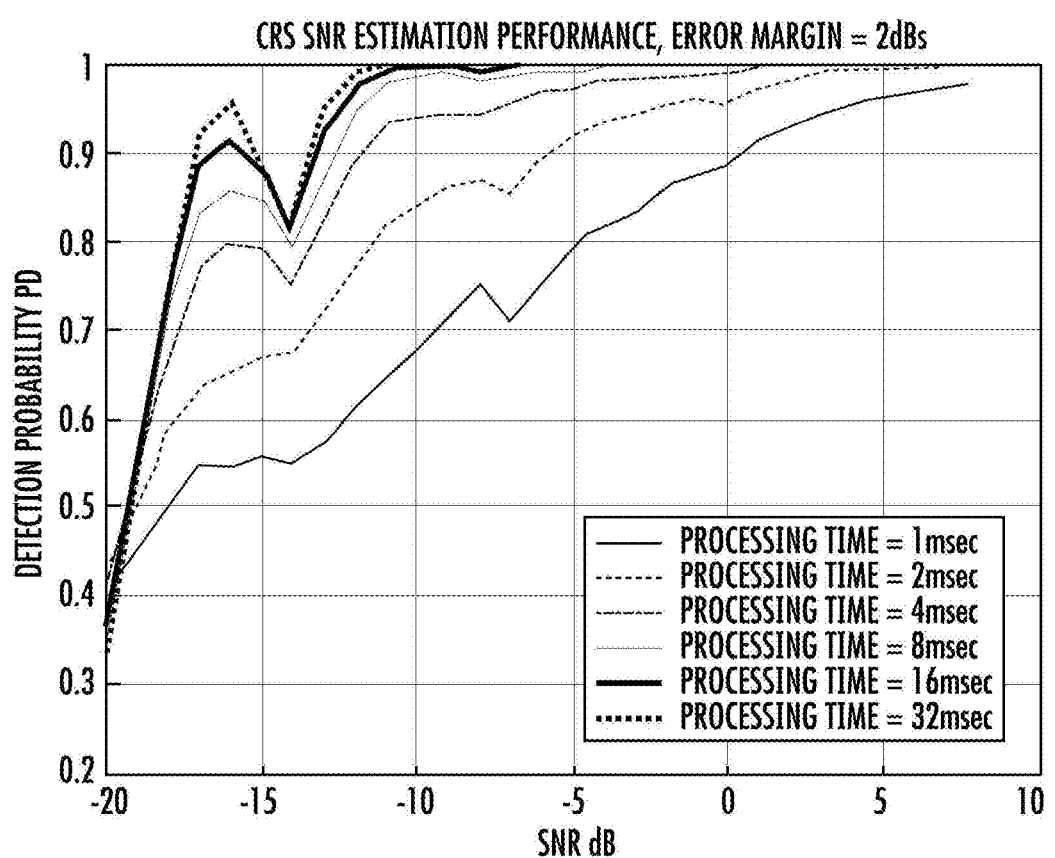

Having thus described certain example embodiments of the present disclosure in general terms, reference will now be made to the accompanying drawings, which are not necessarily drawn to scale, and wherein:

FIG. 1 illustrates an exemplary environment employing a user equipment in accordance with one or more embodiments of the present disclosure;

FIG. 2 illustrates an example block diagram of an IOT device in accordance with one or more embodiments of the present disclosure;

FIG. 3 illustrates an example block diagram of an IOT modem in accordance with one or more embodiments of the present disclosure;

FIG. 4A illustrates an example frame structure in accordance with one or more embodiments of the present disclosure;

FIG. 4B illustrates an example of one PRB in accordance with one or more embodiments of the present disclosure;

FIG. 4C illustrates an example of another PRB in accordance with one or more embodiments of the present disclosure;

FIG. 5 illustrates another example frame structure in accordance with one or more embodiments of the present disclosure;

FIG. 6 illustrates another example frame structure in accordance with one or more embodiments of the present disclosure;

FIG. 7 illustrates an example block diagram of a flow chart of operations for cell quality measurements in accordance with one or more embodiments of the present disclosure;

FIG. 8 illustrates an example hardware diagram for cell quality measurements in accordance with one or more embodiments of the present disclosure;

FIG. 9 illustrates an exemplary graph of NSSS SNR estimation performance in accordance with one or more embodiments of the present disclosure;

FIG. 10 illustrates an exemplary graph of NRS SNR estimation performance in accordance with one or more embodiments of the present disclosure; and FIG. 11 illustrates an exemplary graph of CRS SNR estimation performance in accordance with one or more embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry.

Various example embodiments of the present disclosure are directed to improved systems, apparatuses, methods, and computer programming products for cell quality measurements for cellular internet of things (IOT) systems. Such cellular IOT systems include but are not limited to cellular narrow-band IOT (NBIOT) systems and machine type communication (MTC) systems. Various example embodiments described herein address improvements over the conventional cellular IOT devices complying with the 3GPP NBIOT and MTC specifications.

Various embodiments of cellular IOT devices may include, but are not limited to, mobile devices, cellular meters (e.g., gas and power meters), smart city devices and management systems (e.g., street lighting), asset tracking systems, and the like. Cellular IOT devices may include a cellular IOT modem as described herein. In various example embodiments, reference to user equipment (UE) may also refer to a cellular IOT device.

In some examples, embodiments of the present disclosure provide for improved cell quality measurements. In various embodiments, and in response to the cell ranking according to RSRP, SINR, and RSRQ, a UE may not have the freedom to select its own criterion for cell ranking. 3GPP specifications may define the S-criterion that employ RSRP and RSRQ along with some provided thresholds by the network. For example, selection (or reselection) of a cellular cell may be made in accordance with a standard, such as 3GPP TS 36.304. A UE may measure and rank the cells according to the provided conditions. The improved cell quality measurements of the present disclosure may be, among other things, more accurate than cell quality measurements of conventional systems. The cell quality measurements according to the present disclosure may allow for selection of a cellular cell by a UE for the UE to connect to provide the UE with cellular service. The selection (or reselection) may be based on selection criterion provided by a network through system broadcast information (e.g., system information or SIBs). In various embodiments with multiple cells available to a UE and in some examples, the improved accuracy in cellular quality measurements may allow for ranking of cells and selecting a top ranked cell, which may allow for improved cellular performance.

The cell quality measurements described herein may include using an adaptive channel estimation technique involving least square estimation, adaptive MMSE smoothing filter, and channel averaging to enhance measurement accuracy. Various embodiments may implement adaptively selecting the smoothing filter and a number of segments based on the channel conditions to enhance accuracy under different channel conditions. Embodiments implementing segmentation may utilize channel segmentation in the frequency domain, where an estimated channel may be divided into multiple segments before being used in power or noise calculations, which may result in enhanced accuracy in the presence of residual frequency and timing offset impairments.

In some examples, the cell quality measurements described herein provide numerous improvements over conventional systems. Such example improvements include, but are not limited to, improving accuracy of cell quality measurements, performing faster cell quality measurements, providing robustness against channel variations and receiver impairments, utilizing adaptive channel smoothing, utilizing frequency domain segmentation of the estimated channel, and using averaging to suppress noise. Such improvements are provided while lowering the power demand and lowering the complexity of the hardware utilized. Such hardware may implement resource sharing and run at low clock speeds, which may allow for using more cost effective components that are not as complex or expensive as circuitry providing higher clock speeds.

It should be readily appreciated that the embodiments of the apparatus, systems, and methods described herein may be configured in various additional and alternative manners in addition to those expressly described herein.

Embodiments of the present disclosure herein include systems and apparatuses configured for and to perform one or more operations for improved cell quality measurements for IOT systems and IOT devices.

FIG. 1 illustrates an exemplary environment 100 of a plurality of cells 110 and a UE 120 in accordance with one or more embodiments of the present disclosure. The plurality of cells 110 may provide cellular services to a UE 120, and the UE 120 may select a top ranking cell from among the plurality of cells 110 to connect to. In various embodiments, the cells 110 may provide LTE service to the UE 120.

As illustrated in FIG. 1, there are three cells 110A, 110B, and 110C in the exemplary environment that may provide services to a UE 120. It will be appreciated that this illustration is not limiting and that various embodiments may have more or less cells 110 and more UEs 120. With UEs 120 of IOT devices there may be a large number of IOT devices in an environment 100. Each of the cells 110 may include a eNodeB (eNB) that may be used to transmit and receive cellular signals to and from a UE 120, such as according to cellular standards set by 3GPP.

In various embodiments, the UE 120 may be a cellular IOT apparatus or device. The eNB of a serving cell 110 providing cellular services to the UE 120 may be assigned based on, among other things, cell quality measurements performed by the UE 120. A UE 120 may perform one or more cell quality measurements, such as according to a cell quality measurement algorithm. In various embodiments, the cell quality measurements may include generating an estimate for a plurality of cell quality metrics, including but not limited to Reference Signal Received Power (RSRP), Reference Signal Received Quality (RSRQ), Received Signal Strength Indicator (RRSI), and Signal-to-Interference plus Noise Ratio (SINR). Such metrics may be based on a channel estimation.

The assignment of a UE 120 to a cell 110 may be referred to as cell selection and/or cell reselection. Cell selection and/or reselection is a process of selecting and/or reselecting a network cell 110 based on the network cell 110's measured cell quality. In a cellular IOT network with a plurality of cells 110, a UE 120 may select and camp on a cell 110, sometimes referred to as a serving cell, that satisfies S-criterion and is identified as a top ranked cell. The S-criterion requires information about the Reference Signal Received Power (RSRP) and the Reference Signal Received Quality (RSRQ) for this serving cell. Additionally, the RSRP may define the coverage level of the cell 110 on which the serving cell may offer healthy message exchange between the UE 120 and the network. However, due to physical communication channel dynamics, the UE 120 may be required to monitor the signal quality of the serving cell 110 while measuring the signal quality of the neighbor cells 110. A potential reselection process might be executed if a neighbor cell is determined to have higher ranked cell quality measurements. This reselection process may include the UE 120 switching from a serving cell 110 (e.g., 110A) to another neighboring cell 110 (e.g., 110B) to be assigned the cell 110 with the highest cell quality measurements. Thus, monitoring the signal quality of the serving cell may enhance the UE 120's ability to receive a robust connection to the network.

For example, in various embodiments, a UE 120 may employ channel estimation (e.g., minimum-mean squared error (MMSE) filter) to improve throughput, particularly in deep coverage scenarios. In various embodiments, the Signal-to-Interference and Noise Ratio (SINR) may be required for such an MMSE filter. Additionally, RF impairments, such as Carrier Frequency Offset (CFO) and Sampling Frequency Offset (SFO) are tracked—both estimated and corrected—in adaptive operations to provide system robustness to residual errors. The tracking may be with tracking loops that are further adaptive to the channel conditions when SINR awareness is provided, which may improve the estimation accuracy of the tracking loops.

In various embodiments, the speed of cell quality measurements algorithm performed may be improved by reducing the complexity of the algorithm as well as the circuitry required to perform the algorithm.

The cell quality measurements may be for cellular IOT systems, and cellular IOT systems of NBIOT systems and/or MTC systems are expressly described herein. While determining the cell quality measurements for NBIOT systems and MTC systems may include some differences with regard to specific signals as described herein, the cell quality measurements algorithm has many commonalities in how the cell quality measurements are performed. Various embodiments of the present disclosure described herein may be configured to determine cell quality measurements for both NBIOT systems and MTC systems. For example, the cell quality measurements algorithm may include channel estimation and smoothing techniques to improve the accuracy of the estimated cell quality measurements of cell quality metrics. The cell quality measurements algorithm may further include channel segmentation and averaging techniques, which may improve its robustness against variations in channel conditions and/or receiver impairments.

As further described herein, measuring cell quality may include acquiring the RSRP, RSRQ, and SINR of a cell. Both of RSRP and RSRQ may be data-aided metrics that rely on transmitted reference signals that may differ between NBIOT systems and MTC systems. NBIOT systems may include a NBIOT Reference Signal (NRS) and a NBIOT Secondary Synchronization Signal (NSSS). MTC systems may include a Cell-specific Reference Signal (CRS) an synchronization signals represented by PSS and SSS.

FIG. 2 illustrates an example block diagram of an IOT device 200 in accordance with one or more embodiments of the present disclosure. The IOT device 200 is an example of a UE 120. The IOT device 200 may be comprised of a cellular IOT modem 210, an antenna 220, a reference oscillator 230, a sim card 240, a microcontroller unit (MCU) 250, one or more sensors 260, one or more serial interfaces 270, and additional components and/or circuitry not illustrated (e.g., memory, input/output circuitry, a display). While the antenna 220 is illustrated as being external to the IOT device 200, it will be appreciated that an antenna may be inside of an IOT device 200, such as in IOT devices installed in an environment where the antenna 220 being external to the IOT device 200 may subject the antenna 220 to a harmful environment (e.g., metering applications).

The cellular IOT modem 210 may be where one or more operations described herein are performed for determining cell quality measurements. In various embodiments, the cellular IOT modem 210 may be a NBIOT modem for a NBIOT device or a MTC modem for a MTC device. An exemplary cellular IOT modem 210 is illustrated in FIG. 3 and described further herein.

An antenna 220 may be used to transmit and receive signals to one or more cells 110. The signals transmitted by the antenna 220 may be generated by the cellular IOT modem 210 and other components of the IOT device 200 in accordance with an application. The signals received by the antenna 220 may be processed by the cellular IOT modem before being provided, for example, to an application.

A reference oscillator 230 may generate time and frequency reference clock signals. These time and frequency reference clock signals may be used the cellular IOT modem 210, including in determining cell quality measurements described herein.

In various embodiments, an IOT device 200 may include a sim card 240 that provides unique identification information for use on the cellular network to the IOT device 200. Alternatively, various embodiments may not have a sim card 240 as unique identification information for use on the cellular network may be stored on and provided by other components of the IOT device 200.

A microcontroller unit (MCU) 250 may support the performing of one or more operations, including operations associated with an application. For example, the MCU 250 may perform one or more cellular stack operations, such as cellular stack operations in 3GPP TS 36.320. In various embodiments, a MCU 250 may be comprised of a processor, memory, and input/output circuitry. The input/output circuitry may include connections to sensors 260 and/or serial interfaces 270. The MCU 250 may be configured to executed one or more operations described herein in conjunction with the cellular IOT modem 210.

A processor as described herein may be comprised of a plurality of components and/or processor circuitry. The processor may be implemented as, for example, various components comprising one or a plurality of microprocessors with accompanying digital signal processors; one or a plurality of processors without accompanying digital signal processors; one or a plurality of coprocessors; one or a plurality of multi-core processors; processing circuits; and various other processing elements. The processor may include integrated circuits, such as ASICs, FPGAS, systems-on-a-chip (SoC), or the like. In various embodiments, the processor may be configured to execute applications, instructions, and/or programs stored in the processor, memory, or otherwise accessible to the processor. When executed by the processor, these applications, instructions, and/or programs may enable the execution of one or a plurality of the operations and/or functions described herein. Regardless of whether it is configured by hardware, firmware/software methods, or a combination thereof, the processor may comprise entities capable of executing operations and/or functions according to the embodiments of the present disclosure when correspondingly configured.

The memory, as described herein, may comprise, for example, a volatile memory, a non-volatile memory, or a certain combination thereof. Although referred to as a single memory, the memory may comprise a plurality of memory components. In various embodiments, the memory may comprise, for example, a random access memory, a cache memory, a flash memory, a circuit configured to store information, or a combination thereof. The memory may be configured to write or store data, information, application programs, instructions, etc. so that a processor may execute various operations and/or functions according to the embodiments of the present disclosure. In some embodiments, the memory may be configured to store program instructions for execution by the processor. When operations and/or functions are executed, the stored information may be stored and/or used by the processor.

IOT devices 200 may include one or more sensors 260. The sensor(s) 260 may vary with the application the IOT device 200 is associated with. For example, various embodiments of IOT devices 200 for street lighting applications may include light sensors to assist with controlling the operation of a street light. Various embodiments may include temperature sensors to assist with one or more operations. For example, a temperature sensor may assist with controlling an oscillator.

Serial interfaces 270 may be a portion of input/output circuitry of an IOT device 200. The input/output circuitry may communicate with the processor to receive instructions input by a user and/or to provide audible, visual, mechanical, or other outputs to a user. The input/output circuitry may comprise supporting devices, such as a keyboard, a mouse, a user interface, a display, a touch screen display, lights (e.g., warning lights), indicators, speakers, and/or other input/output mechanisms. The input/output circuity may comprise one or more interfaces, such as serial interfaces 270, to which supporting devices may be connected. For example, supporting devices may be connected to provide or receive application data for an application being executed by the MCU 250. In some embodiments, interfaces may in SPI and UART interfaces.

FIG. 3 illustrates an example block diagram of a cellular IOT modem 210 in accordance with one or more embodiments of the present disclosure. In various embodiments, a cellular IOT modem 210 may be comprised of one or more amplifiers 310, down converters 320, frequency synthesizer 330, A/D converters (ADC) 340, receiver processor 360, and cell quality measurements circuitry 350. The cellular IOT modem 210 may also be electrically connected and/or coupled to an antenna 220 and a reference oscillator 230.

In various embodiments, a signal may be received by the antenna 220. The signal may be transmitted to an amplifier 310, which may amplify the signal received from the antenna 220. A reference oscillator 230 may provide a reference clock signal, such as a clock signal, to a frequency synthesizer 330. The frequency synthesizer 330 may generate one or more frequencies as multiples of the reference clock signal. The one or more frequencies may be provided to the down converter 320 to convert the signal received from the amplifier 310 down to a baseband signal. This baseband signal may be provided to an analog-to-digital converter (ADC) 340 to convert the analog signal to a digital signal. The digital signal may be provided from the ADC 340 to the cell quality measurements circuitry 350 as well as the receiver processor 360.

The cell quality measurements circuitry 350 may perform one or more operations described herein for determining cell quality measurements. The cell quality measurements circuitry 350 may perform these operations alone or along with receiver processor 360, MCU 250, and/or other components electrically connected or coupled to the cell quality measurement circuitry 350. For example, in some embodiments the cell quality measurements circuitry 350 be a portion of the receiver processor 360, which allows for resource sharing and a reduction in hardware.

The cell quality measurements circuitry 350 may provide cell quality measurements to the receiver processor 360 as well as to other components outside of the cellular IOT modem 210 (e.g., MCU 250), illustrated with reference no. 370. The receiver processor 360 may, among other things, utilize the cell quality measurements to determine a selection and/or reselection process. The receiver processor 360 may also operate the cellular IOT modem 210 to receive and transmit signals to a serving cell during operation of the IOT device 200.

As previously described, MTC systems and NBIOT systems may include distinction in their frame structures, particularly references and/or synchronization signals and CRS for MTC and NRS; and NSSS for NBIOT. FIGS. 4A-6 illustrate these example distinctions between MTC systems and NBIOT systems. These distinctions in the frame structures include the different reference signals used in determining cell quality measurements described herein. FIGS. 4A-4C and 5 illustrates frame structures for various embodiments of MTC systems and FIG. 6 illustrates frame structures for various embodiments of a NBIOT system.

For MTC operations for IOT applications, 3GPP released specifications for a Rel-13 low-complexity low-data rate UE 120 that addresses these applications. These specifications may be referred to as a bandwidth-reduced extended coverage (BL/CE) UE category. Among others, there are three enabling feature for BL/CE devices. First, a reduced bandwidth of 1.4 MHz for the downlink and uplink is supported with the ability to operate within any cell bandwidth, including narrowband. A narrowband being defined by 3GPP as six non-overlapping consecutive physical resource blocks in the frequency domain. The narrowband, in some examples, will be the basic unit by which MTC devices are scheduled. Second, the maximum transmit power of the new UE 120 power should be reduced such that an integrated power amplifier (PA) implementation may be possible. Third, providing LTE coverage corresponding to approximately −15 dB for frequency-division duplexing (FDD), which is implemented by repetition.

FIGS. 4A and 4B illustrate the frame structure and physical resource blocks for embodiments utilizing an MTC system.

FIG. 4A illustrates an example frame structure in accordance with one or more embodiments of the present disclosure. The frequency spectra for the LTE are formed as concatenation of physical resource blocks (PRBs) 410. In the embodiment illustrated in FIG. 4A, a FDD downlink radio frame structure for 20 MHz cell is illustrated. In various embodiments, the radio frame structure may have a time period of 10 ms. The height 402 of the illustrated radio frame structure is 20 MHz with 100 PRBs 410. Each PRB may span 180 kHz with an active part of the 20 MHz that carries the 100 PRBs being 18 MHz while the remaining 2 MHz is left as guard band. Each PRB 410 may be 12 subcarriers in frequency and 1 ms in time. Thus, in some embodiments, length 412 may be 1 ms. In some embodiments, the 1 ms in time may be mapped to 14 OFDM symbols for Normal CP (or 12 OFDM symbols for Extended CP mode). The illustrated radio frame structure includes legacy control symbols 404 followed by 100 PRBS 410. The 100 PRBS 410 are illustrated as 0 to 99 at reference numbers 410A to 410N. While the legacy control symbols 404 are illustrated before each PRB, this illustration is to illustrate that legacy control symbols are present for each PRB 410. Thus FIG. 4 illustrates that a portion of each PRB 410 may include legacy control symbols 404. This portion of each PRB 410 that may include legacy control symbols may be a duration 446. The portion of each PRB 410 that does not include legacy control symbols may be duration 448. It will be readily appreciated that while the legacy control symbols 404 and the plurality of PRBs 410 are illustrated separately, the legacy control symbols 404 are a part of the PRBs 410. As illustrated and described further herein, the legacy control symbols 404 may actually be the first one, two, or three OFDM symbols of each PRB 410.

FIG. 4B illustrates an example of one PRB 410 in accordance with one or more embodiments of the present disclosure.

FIG. 4C illustrates an example of another PRB in accordance with one or more embodiments of the present disclosure.

Each PRB 410 may be 12 subcarriers in frequency and 1 ms in time. Thus, in some embodiments, length 412 may be 1 ms. In some embodiments, the 1 ms in time may be mapped to 14 OFDM symbols (e.g., 416A-N) for Normal CP mode (or 12 OFDM symbols for Extended CP mode). Each PRB may have a height of 12 subcarriers (SCs) 424 (e.g., 424A to 424N). In various embodiments, subcarriers may be referred to as resource elements (REs). Each subcarrier 424 may be separated from another subcarrier by 15 KHz. In various embodiments, the total bandwidth of a PRB 410 may be 180 KHz.

In the illustrated configurations of FIGS. 4A and 4B enable transmission bandwidth from 1.4 MHz with 6 PRBs 414 to a maximum bandwidth 402 of 20 MHz consisting of 100 PRBs. Different embodiments may have different bandwidths 402, including the available channel bandwidths of 1.4 MHz, 3 MHZ, 5 MHz, 10 MHz, 15 MHz, or 20 MHz.

A PRB 410 may have a duration 412 of each radio frame is 10 ms. As illustrated in FIG. 4B, each 10 ms radio frame 412 is comprised of 10 equal-period subframes 416A-416J.

In the embodiment illustrated in FIG. 4C, a PRB has a height 420 of 12 subcarriers 424 (e.g., 424A-424L), with each subcarrier with a width 422 of 14 OFDM symbols 426 (e.g., 426A-426N) for a normal prefix (or 12 OFDM symbols for an extended cyclic prefix is utilized, which is not illustrated). The PRB is subdivided into a two slots 436 of 0.5 ms duration. The two slots 436A and 436B may be referred to as Slot 0 and Slot 1, respectively. The reference to the slot may be incremented for each additional PRB 410 (e.g., a second PRB has a Slot 2 and Slot 3, and third PRB has a Slot 4 and Slot 5, and so on).

Each slot 436A, 436B is composed of seven (or six) OFDM symbols 426. Legacy control information is carried by the first two OFDM symbols 426 illustrated at portion 446 of sub-frame 416 (or first OFDM symbol 416 according to the bandwidth) except where a cell specific RE 434 may occupy one or more OFDM symbols 416 of the first two OFDM symbols 426. The legacy control information may contain information about the data scheduling, mapping, modulation, etc. that various UEs 120 use to receive their dedicated messages. The other OFDM symbols 426 at portion 448 of the sub-frame are data occupied REs.

A PRB may include a plurality of cell specific REs 434, which are illustrated as darkened subcarriers or REs. In FIG. 4B, there are 8 cell specific REs 434, which are located at locations described by the OFDM symbol 426 and the subcarrier 424 of the subframe 416. The locations are indexed from the lower left to the upper right, which may be referred to as $P_{SYM}(SC)$ where SYM indicates the column number associated with the OFDM symbol 426 starting with 0 and SC indicates the row number associated with the subcarrier 424 starting with 0. For example, the OFDM symbol 426 indicated at reference no. 434 has a location indexed as $P_{11}(6)$.

LTE systems may include downlink reference signals and downlink synchronization signals. Downlink reference signals support the channel estimation functionality needed to equalize and demodulate the control and data information. The downlink reference signals also enable the channel measurements for channel quality indication, cell reselection processes, and handover processes. Synchronization signals are related to the physical layer (PHY) cell identity.

Downlink reference signals may be cell 110 specific, which may be referred to as Cell-Specific Reference signals (CSRs). CSRs are one of the various downlink reference signals and are common to all users in a cell 110. CSRs are transmitted in every downlink subframe 416 according to 3GPP Rel-14 as well as preceding versions.

CSRs employ a cell-specific frequency shift derived as the modulo division of the cell ID by 6. For antenna 220 with a single port (e.g., port 0), the CSRs are mapped to two unique OFDM symbols 426 within the slot in a comb-pilot mapping fashion, where the CSRs mapped to the second symbol 426 is circularly shifted by 3 REs relative to the CSRs mapped to the first symbol as shown in FIG. 4C. The CRS sequence is generated by a unique gold-sequence generator which is initialized according to the cell ID, CP type, and cell timing information. The sequence may then be modulated through QPSK and mapped to the REs.

Downlink synchronization signals are also defined by 3GPP in LTE standards. In such standards, downlink synchronization signals are used in a variety of procedures, including the detection of frame boundaries, initial cell search, neighbor cell search, and handover. Two downlink synchronization signals are available in the LTE: the primary synchronization signal (PSS) and the secondary synchronization signal (SSS). These downlink synchronization signals relate to the PHY cell identity. There are 504 cell identities defined in the LTE standards, which are organized into 168 groups, each of which contains three unique identities. The PSS carries the unique identities 0, 1, or 2, whereas the SSS carries the group identity with values 0 to 167. Thus, the PHY cell identity $N_{Cell\ ID}=3N_{ID}^{1}+N_{ID}^{2}$ is uniquely defined by a number $N_{ID}^{1}$ in the range of 0 to 167, representing a cell ID group, and a number $N_{ID}^{2}$ in the range of 0 to 2, representing a sector ID within the group.

FIG. 5 illustrates another example frame structure in accordance with one or more embodiments of the present disclosure. In FIG. 5, the frame structure includes a bandwidth 502 of 3 MHz comprising 15 PRBs 410. The frame structure may be divided into two narrowband groupings 504A and 504B, each of which is comprised of 6 PRBs.

In FIG. 5, the radio frame includes a plurality of subcarriers, particularly a central 72 subcarriers of an LTE. The 72 subcarriers span, as illustrated, from a fourth PRB 410 to a tenth PRB 410. A radio frame is comprised of 10 subframes 522, and each subframe may be comprised of two slots 526. FIG. 5 illustrates three of the 10 subframes. Specifically, subframe 0 510A with width 522A, subframe 5 510B with width 522B, and subframe 9 510C with width 522C are illustrated (and subframes 1-4 and 6-8 are not illustrated). Each subframe is divided into two slots, each with equal length. For example: subframe 0 510A with length 522A is subdivided into slot 0 with length 526A and slot 1 with length 526B; subframe 5 with length 522B is subdivided into slot 10 with length 526C and slot 11 with length 526C; and subframe 9 with length 522C is subdivided into slot 18 with length 526E and slot 19 with length 526F.

For a grouping 506 of 6 PRBs, both the PSS 530 and the SSS 540 are mapped onto the subcarriers. For the PSS 530 and SSS 540, the central 62 subcarriers are the synchronization signal while another 10 subcarriers on the boundaries (e.g., five on the top illustrated at 512A, 512B and five on the bottom illustrated at 514A, 514B) padded with zeros. This forms the central 6 PRBs of grouping 506 (72 subcarriers located around the DC subcarrier). Using the frame structure of FIG. 5, a UE 120 may receive both the PSS 530 and SSS 540 without prior knowledge of the downlink bandwidth 502. In other words, the downlink bandwidth 502 may be unknown as the PSS 530 and SSS 540 are located around a DC subcarrier in a grouping 506 of a central 6 PRBs.

In an FDD frame, and as illustrated in FIG. 5, the PSS 530 and SSS 540 are positioned next to each other in subframes 0 510A and subframe 5 510B. Specifically, the PSS 530 and SSS 540 are positioned next to each other in the last two OFDM symbols of slots 0 (i.e., 526A) and 10 (i.e., 526D), respectively.

FIG. 6 illustrates another example frame structure in accordance with one or more embodiments of the present disclosure. In particular, FIG. 6 illustrates an embodiment with a frame structure for an NBIOT system.

In various embodiments of a NBIOT system, a NBIOT carrier may assume either an anchor deployment or a non-anchor deployment. In anchor deployments an anchor carrier or specific PRB 410 may be used to page an NBIOT device. In a non-anchor deployment, the NBIOT carrier or PRB 410 may be one of a plurality of carriers or PRBs. Under either deployment, cell quality measurements may be determined at least for SINR estimation purposes. Cell quality measurements described herein may be provided for both anchor and non-anchor deployments. FIG. 6 illustrates an anchor deployment with the illustration of NPBCH, NPSS, and NSSS.

FIG. 6 illustrates a frame structure with a LTE carrier bandwidth 502 of 3 MHz. The frame structure is comprised of 15 PRBs 410A-4100. For an in-band deployment, a single PRB 410M is assigned to NBIOT. In the illustrated embodiment with a carrier bandwidth 502 of 3 MHz, the PRB 410M may have a bandwidth of 180 kHz.

The radio frame of FIG. 6 may consist of 10 subframes of equal duration. FIG. 6 illustrates subframe 0 at reference no. 600, subframe 1 at reference no. 601, subframe 5 at reference no. 605, and subframe 9 at reference no. 609. Subframes 2-4 and 6-8 are not illustrated. Subframe 0 (i.e., 600) has a duration 620, subframe 1 (i.e., 601) has a duration 630, a subframe 5 (i.e., 605) has a duration 640, and a subframe 9 (i.e., 609) has a duration 650. Each duration is of 14 OFDM symbols (for Normal CP mode), which has a duration of 1 ms.

FIG. 6 illustrates each of the illustrated subframes being distinct. Subframe 0 may be a broadcast channel, NPBCH subframe, or NPHCH subframe; subframe 1 may be a data/control subframe or NPDCCH/NPDSCH subframe; subframe 5 may be a NPSS subframe; and subframe 9 may be a NSSS subframe for even radio frames as NSSS is mapped every other radio frame starting with an even radio frame. Each subframe may include a first number of columns of OFDM symbols of legacy control REs (e.g., 622, 632, 642, and 652). A subframe may, or may not, include a plurality of NRS REs 662. Certain subframes, such as subframe 0 and subframe 1 may, or may not, include a plurality of CRS REs 664, which may be based on whether the deployment is in-band or not.

Each subframe, as described herein, may be divided into two slots with equal periods. For example, subframe 0 600 may be divided into a Slot 0 626A and a Slot 1 626B, subframe 1 601 may be divided into a Slot 2 636A and a Slot 3 636B, subframe 5 605 may be divided into a Slot 10 646A and a Slot 11 646B, and subframe 9 609 may be divided into a Slot 18 656A and a Slot 19 656B. For various embodiments, NBIOT may only support a normal CP type with each slot comprised of 7 OFDM symbols and each subframe comprised of 14 OFDM symbols.

In various embodiments with a signal sampled at 1.92 MSamples/sec, the CP length of the first symbol in each slot may be 10 samples and those of the other symbols may be 9 samples. In such embodiments, the OFDM symbol may span 128 sub-carriers.

NBIOT employs synchronization signals, particularly narrowband primary synchronization signal (NPSS) and narrowband secondary synchronization signal (NSSS). NPSS and NSSS sequences may be constructed from a frequency domain Zadoff-Chu sequence where NPSS length is 11 samples while the NSSS consists of 132 samples. The NPSS, $P_l(n)$, is generated such that $$P_l(k) = Q(l)e^{-j\pi u k(k+1)/11}$$

where $0 \le k < 11$, $3 \le l < 14$ is the OFDM symbol index;
u, the root sequence, =5; and
Q(l) is a modulation sequence given by $\{1,1,1,1,-1,-1,1,1,1,-1,1\}$.

In NBIOT systems, there are 504 unique physical cell IDs. However, physical cell ID is only indicated by the NSSS. The NSSS, S(k), is generated according to:

$$S(k) = \bar{C}_q(k')e^{-j2\pi\theta_f k}e^{-j\frac{\pi u k(k+1)}{131}}$$

$0 \le k < 132$;

k'=k mod 128;

u, the root sequence, is related to the cell ID, $N_{ID}^{Ncell}$, by $u=(N_{ID}^{Ncell} \bmod 126)+3$;

$\theta_f$, the cyclic shift, is related to the system frame Number (SFN), $n_f$, such that $$\theta_f = \frac{31}{132}\left(\frac{n_f}{2}\right) \bmod 4.$$

$\overline{C}_q(k')$, a modulated sequence, is given by $\overline{C}_q(k')=2C_q(k')-1$, where q is a cell specific parameter that is given by $q=\lfloor N_{ID}^{Ncell}/126 \rfloor$ and $C_q$ forms four complementary 128-bits binary sequences.

In NBIOT systems, NPSS is mapped to subframe 5 605 of the NBIOT PRB 410M for every radio frame. NSSS is mapped to the last 11 ODFM symbols of subframe 9 609 in radio frames having $n_f$ mod 2=0. Sequences are mapped to frequency sub-carriers in an increasing order, then applied across the OFDM symbols in time.

In various embodiments, reference signals or pilots, namely NRS (illustrated in FIG. 6 as 662), are inserted within the transmitted signal to assist the channel estimation/measurements processes. NRS 662 uses a cell-specific frequency shift derived as the modulo division of the NBIOT cell ID by 6. The conventional LTE CRS sequence may be reused for NRS generation where the center of LTE CRS sequence is employed as NRS 662 sequence. As shown in FIG. 6, the NRS 662 may be mapped to the last two OFDM symbols of the slot for one/two antenna ports in case of single port/transmit diversity modes, respectively.

For subframe 5 605 of an NPSS subframe and subframe 9 609 of an NSSS subframe, NRS 662 are not mapped to these subframes because the NPSS and NSSS occupy the last 11 OFDM symbols within these respective subframes for transmitting NPSS/NSSS for normal CP. For demodulation and/or measurement performance, NRS 662 is transmitted in all valid subframes (e.g., subframe 0 and subframe 1 of FIG. 6), except the NPSS and NSSS subframes (e.g., subframes 5 and subframe 9, respectively).

FIG. 7 illustrates an example block diagram of a flow chart of operations for cell quality measurements in accordance with one or more embodiments of the present disclosure. In FIG. 7, a cellular signal may be received by an antenna 220 and provided to the cellular IOT modem 210. The cellular IOT modem 210 may include a plurality of components to convert a cellular signal received by the antenna 220 into a frequency domain (FD) signal using analogue/RF processing operations 701 and time domain signal processing operations 702. In various embodiments, cell quality measurements may be estimated based on the FD signal according to a cell quality measurement algorithm 740 comprised of operations described herein.

The analogue/RF processing operations 701 may include a low noise amplifier operation 710, a N PPM operation 712, a mixer operation 714, a variable gain amplifier operation 716, and an analog-to-digital converter (ADC) operation 718. The time domain signal processing operations 702 may be performed to generate an FD signal, and may include a timing/frequency synchronization/tracking module operation 720, a frequency comparator operation 722, a CP removal operation 724, a half SC shift operation 726, and a FFT operation 730.

A low noise amplifier (LNA) operation 710 may receive a signal from an antenna 220. In some embodiments, the LNA may have a low noise contribution and, thus, a small noise figure.

A N part per million (PPM) operation 712 may utilize a crystal or oscillator that may provide a carrier frequency for a mixer operation 714 and/or an ADC operation 718. The crystal or oscillator may, with the N PPM operation 712, provide the carrier frequency with N part per million accuracy.

A mixer operation 714 may receive a signal from the low noise amplifier operation 710 and a carrier signal from an N PPM operation 712 (e.g., an oscillator). The mixer may mix the signal according to the carrier frequency of the carrier signal to shift the signal from the carrier frequency to a baseband to provide a baseband signal. A proper signal filtration may also be required as part of the signal mixing. The mixer operation 714 may provide the baseband signal to a variable gain amplifier.

A variable gain amplifier operation 716 may amplify a baseband signal to generate an amplified baseband signal. The amplified baseband signal may be provided to an ADC converter.

An ADC operation 718 may receive an amplified shift signal from a variable gain amplifier operation 716 and a sampling clock signal from an N PPM operation 716 (e.g., from an oscillator). The ADC operation 718 may convert the amplified baseband signal to a digital signal. The ADC operation 718 may convert the pulses to a digital pulse signal.

Timing/frequency synchronization may be required to estimate the sample timing and frequency offset relative to the serving cell timing and frequency. A timing/frequency synchronization/tracking module operation 720 may be used to estimate the residual timing/frequency offset encountered due to the channel variations/temperature.

A frequency comparator operation 722 may correct a frequency offset that is estimated by the frequency synchronization/tracking loops.

A cyclic prefix (CP) removal operation 724 may remove a CP from the digital signal. Additionally, sample timing correction from the tracking loop may be applied at the CP removal operation 724.

A half SC shift operation 726 may shift the digital signal by have a subcarrier.

A FFT operation 730 may synthesize the OFDM symbols from the time domain (TD) to the frequency domain (FD).

The time domain signal processing operations 702 may provide an FD signal to the cell quality measurements algorithm 740. The cell quality measurement algorithm 740 may include a plurality of operations (e.g, operations 750-764) to determine cell quality measurements. First, channel estimation operations 742 including a least squares operation 750, segmentation and channel filter operation 752, and time domain (TD) averaging operation 754 may be performed to perform channel estimations. In various embodiments, a linear channel estimator may be employed. The linear channel estimator may provide for a low complexity design.

In a least squares operation 750, channel estimates at the reference signal positions may be obtained while applying de-noising techniques to improve the channel estimation quality. The LS operation 750 may be different between NBIOT systems and MTC systems. However, in both NBIOT systems and MTC systems, the received FD signal from the FFT 730, assuming timing and frequency offsets have been compensated for, may be expressed as:

$$X(l,k)$$

l represents the OFDM symbol index; and k is the subcarrier (SC) index.

The least squares (LS) operation 750 may be computed for the reference signals in the FD signal. The LS operation 750 may be computed as:

$$LS(l, k) = X(l, k)X_{REF}^*(l, k)$$

For CRS/NRS: $l \in l_p$ and $k \in k_p$; and

For MTC: SSS: $l_{PSS}$=6, $l_{SSS}$=6, $k \in k_{PSS}$=$k_{SSS}$=[5:66];

For NBIOT: SSS: $l \in l_{SSS}$ and $k \in k_{SSS}$.

In embodiments with CRS/NRS, the LS operation 750 is evaluated at the pilot positions, particularly the set of $l_p$ and $k_p$.

In MTC embodiments with SSS, the LS operation 750 may be computed for the whole SSS subframe such that $l_{PSS}$=[0, . . . ,5]; $l_{SSS}$=[0, . . . ,5], $k_{PSS}$=[0, . . . 11], and $k_{SSS}$=[0, . . . 11]. In NBIOT embodiments with SSS, the LS operation 750 may be computed for the whole SSS subframe such that $l_{SSS}$=[3, . . . , 13] and $k_{SSS}$=[0, . . . 11].

In various embodiments for IOT LTE-based applications where deep coverage is required, an IOT device 200's mobility may be limited (i.e., the IOT device 200 may physically move very little) and the IOT device 200 is not expected to have fast channel variations. Thus, the channel may be assumed to be constant over one slot (i.e., 0.5 msec). For these embodiments this assumption may reduce the channel estimation complexity without impacting the measurement performance for applications.

In various embodiments of NBIOT systems, the channel may be assumed to be constant over two consecutive OFDM symbols that carry the NRS per slot. Thus, the sets $l_p$ and $k_p$ may define one pilot every three pilots for one OFDM symbol per slot.

In various embodiments of MTC system, the channel may be assumed to be constant over one slot carrying CRS. Thus, the sets $l_p$ and $k_p$ define one pilot every three pilots for one OFDM symbol per slot.

As demonstrated with the equation above for LS operation 750, the LS operation 750 may be a multiplication unit. In various embodiments where a reference signal is QPSK modulated, the multiplication unit may be simplified to two adders/subtractors.

Tracking loops in various embodiments may significantly impact the quality of the channel estimation by the channel estimation operations 742. Timing tracking loop may be a process that employs the reference signal to estimate the sample timing offset that may result from the channel variations and the residual sampling frequency offset. The time tracking loop accuracy may be impacted by the coverage level. At low SNR scenarios, even with an optimal time tracking, there may be a non-zero timing offset. If there is an uncompensated timing drift, such as due to a tracking loops' accuracy (or lack thereof) or due to channel variation of long time periods, the uncompensated timing drift may introduce a linear phase to the estimated LS operation 750. In various embodiments, such as those with a linear phase a channel filter operation 750 of the LS operation 748 may fade at specific SCs where a phase causes destructive combining, and this may be overcome with the segmentation.

Various embodiments may include a segmentation and channel filter operation 752. In various embodiments the LS operation 750 may include a segmentation operation that adaptively divides the output of the LS operation 750 into non-overlapping segments in the frequency direction. Each segment may have a segment length of $L_S$ SCs. Segment length $L_S$ may be chosen adaptively based on an allowed tolerance of the tracking loops, which may include whether the tolerance results in significant phase disruption. Additionally, the segmentation and channel filter operation 752 may use a channel filter to filter out noisy channel taps.

Segmentation, or the manner in which segmentation may be performed, may be adaptive by being based on if the IOT system is an NBIOT system or an MTC system. In various embodiments of NBIOT systems, the FD signal may span 1 PRB and phase disruption may be significantly small. As such, various embodiments of NBIOT systems may not include segmentation or, alternatively, various embodiments of NBIOT systems may have one segment. The one segment may be formed by the reference signals per one OFDM symbol (i.e., $L_S$=K, where K is the number of SCs carrying the reference signals). In various embodiments of MTC systems, the FD signal span 6 PRBs and phase disruption may be significant over the 6 PRBs and, thus, segmentation may be required.

Various embodiments may implement a pure FIR filter based on the number of time domain channel taps that contain the channel information and that are required to be passed by the filter. A filter length may vary according to the segment length $L_S$ and the operating reference signal type.

A segmentation and channel filter operation 752 may be filtered by a channel filter that passes filter length $L_{CH}$ taps sampled at the signal sampling rate for the segment length $L_S$ for each individual segment. The segmentation and channel filter operation 752 may include a smoothing filter that rejects the noisy taps of the LS channel estimates. The smoothing filter may improve the channel estimation quality by rejecting noisy taps.

In various embodiments with noisy channel taps, the filter length $L_{CH}$ may be chosen to reject the noisy channel taps for the smallest delay spread while not cutting out the channel taps for the channels that have a long delay spread.

The smoothed LS per segment may be computed as:

$$LS_{Smoothed}(l, s) = \sum_{n=0}^{L_S-1} LS(l, s+n)H_{FILT}^s(n)$$

$H_{FILT}^s(n)$ is the smoothing filter for subcarrier s within the segment; and $L_S$ is the filter length or is the number of available reference signal SCs per OFDM symbol per segment.

The segmentation and channel filter operation 752 may be repeated for K/$L_S$ segments, where K is the number of available reference signal SCs per OFDM symbol. For NBIOT systems, K=12 for SSS and K=4 for NRS. For MTC systems where 6 PRBs 410 are allocated, K=24.

A time domain (TD) averaging operation 754 may average the smoothed LS from the segmentation and channel filter operation 752 (i.e., $LS_{Smoothed}(l,s)$). In the TD averaging operation 754, the estimated channel is computed for M estimation windows as:

$$\hat{H}_m(k) = \frac{1}{L_{AVG}} \Sigma_{n=0}^{L_{AVG}-1} LS_{Smoothed}(mL_{AVG} + n, k),$$

$L_{AVG}$ is the averaging depth of the coherent channel estimation, which may be limited by the residual carrier frequency offset (CFO); and $m \in \{0,1,2, \ldots M-1\}$.

The averaging depth $L_{AVG}$ may be selected based on sensitivity and/or noise rejection. In various embodiments, the averaging depth $L_{AVG}$ selection may be shortened to not be sensitive to phase disruptions from a residual CFO. Alternatively, in various embodiments the averaging depth selection may be enlarged to reject more noise, such as in various embodiments of deep coverage scenarios where aggressive noise rejection may be beneficial. Additionally, or alternatively, the averaging depth may also be optimized for expected residual errors, channel conditions, and SINR range. In various embodiments, the averaging depth may be selected to be a power of 2.

The channel estimation operations 742 may generate a channel estimation $\hat{H}_m(k)$ that may be used in the other operations of the cell quality measurement algorithm 740.

A RSRP evaluation operation 756 may determine a digital RSRP as a linear average of the subcarrier power over the M windows such that:

$$RSRP_{Linear} = \frac{1}{M} \sum_{m=0}^{M-1} \left[ \frac{1}{K} \sum_{k=0}^{K-1} |\hat{H}_m(k)|^2 \right].$$

In various embodiments, a compensation factor may be required to refer the RSRP to the antenna port. The compensation factor may compensate for an analogue gain introduced by LNA 710 and VGA 716 as well as the power leakage from the ADC 718 in addition to any digital scaling employed by digital processing, including the FFT. In various embodiments, the compensation and leakage factor may be G dBs and the RSRP may be determined in dBs as:

$$RSRP_{Antenna} = 10\log_{10}(RSRP_{Linear}) + G$$

A RSSI evaluation operation 758 may determine a RSSI as the linear average of the total power received within one OFDM symbol that carries NRS. RSSI may be determined as:

$$RSSI_{Linear} = \frac{1}{ML_{AVG}} \sum_{m=0}^{M-1} \sum_{n=0}^{L_{AVG}-1} \sum_{k=0}^{K-1} |X(mL_{AVG} + n, k)|^2$$

where $mL_{AVG}+n \in l_p$.

A RSRQ evaluation operation 760 may determine a RSRQ defined as the ratio of the linear RSRP to the RSSI as:

$$RSRQ = \frac{RSRP_{Linear}}{RSSI_{Linear}}$$

A noise variance estimation operation 762 may estimate noise variance, which may use an unbiased estimator. The noise variance estimation operation 762 may be based on a model of the received FD signal as additive white Gaussian noise (AWGN) added to a weighted version of the reference signal by the corresponding channel gain. The noise variance per subcarrier may be estimated as:

$$VAR(noise) = \frac{1}{MKL_{AVG}} \sum_{m=0}^{M-1} \sum_{n=0}^{L_{AVG}-1} \sum_{k=0}^{K-1} |X(mL_{AVG} + n, k) -$$

$$X_{REF}(mL_{AVG} + n, k)\hat{H}_m(k)|^2$$

A SINR evaluation operation 764 may determine a SINR as the ratio of the linear RSRP and the noise variance as:

$$SINR = \frac{RSRP_{Linear}}{VAR(noise)}$$

In various embodiments, the SINR evaluation operation 764 may have a variation of less than 1 dB for 99% of the time.

The SINR (e.g., at 770A), RSRQ (e.g., at 770B), and RSRP (e.g., at 770C) may be provided from the cell quality measurement circuitry 350 to the receiver processor 360 and/or MCU 250. The SINR, RSRQ, and RSRP may be utilized as described herein, such as in a selection and/or reselection process.

FIG. 8 illustrates an example hardware diagram for cell quality measurements in accordance with one or more embodiments of the present disclosure. In various embodiments, the example hardware diagram of FIG. 8 illustrates the cell quality measurement circuitry 350. Alternatively, in various embodiments a portion of the example hardware diagram illustrated in FIG. 8 may be located in the cell quality measurements circuitry 350 and a portion may be located outside of the cell quality measurements circuitry 350 but inside the cellular IOT modem 210.

The example hardware diagram of FIG. 8 may be divided generally into 3 portions: a first portion 802, a second portion 804, and a third portion 806. Each portion may include circuitry for performing one or more operations of cell quality measurement algorithm 740. A first portion 802 may include channel estimation where a reference signal or a synchronization signal is used to estimate the channel. The first portion may include circuitry for performing LS operation 750. A second portion 804 may include channel smoothing and averaging. The second portion may include circuitry for performing segmentation and channel filter operation 752 and TD averaging operation 754. A third portion 806 may include noise variance and power estimation where the estimated channel and the received signal are used to estimate the noise variance and signal power. The third portion 806 may include circuitry for performing noise variation estimation operation 762 and RSRP evaluation operation 756. Not in one of these portions, the RSSI evaluation operation 758 may be performed by RSSI evaluator circuitry 826.

Receive (RX) reference signal buffers 810 may receive and store reference signals or synchronization signals from FFT 730. A reference signal generator 812 may generate a reference signal to be provided to the least squares (LS) channel estimation circuitry 814, and the reference signal generation may be performed during the least square (LS) channel estimation. A LS estimator 815 may be used to obtain a channel estimation based on the RX reference signal and/or a RX synchronization signal. LS channel estimation is determined by multiplying the received data by the conjugate of reference signal as described herein. In various embodiments this may be performed using a normal complex multiplier circuitry. The channel estimations may be stored in the channel estimation buffers 816.

A smoothing filter 820 may be applied to the estimated LS channel to obtain a smoothed channel estimate. In various embodiments, a channel estimated may be segmented and the smoothing filter 820 may apply to one or more segments as described herein. Channel estimation smoothing may be performed by multiplying a smoothing matrix by the LS channel estimation samples. In various embodiments, a single multiplier may be used for the smoothing operation. Alternatively, in various embodiments a smoothing matrix may be comprised of a plurality of multipliers. The matrix may have a different multiplier for each of the segments of a channel estimation. The smoothed channel estimate may also be averaged over time at the smoothing filter 820 to obtain a smoothed and averaged channel estimate. Channel estimation smoothing coefficients and averaging coefficient may be stored in a smooth/averaging coefficient buffer 818. The smooth/averaging coefficient buffer 818 may be included in the cellular IOT modem 210 or may be outside of the cellular IOT modem 210 but in a UE 120, such as stored in memory.

A signal power evaluator circuitry 822 may be used to estimate a RSRP. The RSRP may be estimated as a function of the smoothed and averaged channel estimate as described herein.

The signal power evaluator circuitry 822 for performing an RSRP evaluation operation 756 may support four modes of operation (PSS, SSS, PS, RS) that could run in parallel. In various embodiments, the MCU 250 may perform the RSRP evaluation operation 756 by squaring and averaging the channel estimation samples as described herein. Averaging for every mode may be made in a dedicated state register (not illustrated).

A noise variance evaluator circuitry 824 may be used to perform a noise variance estimation operation 762 described herein. The noise vairance evaluator circuitry 824 may received inputs that are: the output of the TD averaging operation 754; (ii) the output of the FFT 730; and a reference signal from the reference signal generator 812.

A evaluator circuitry 826 may be used to perform a RSSI evaluation operation 758 as described herein.

As described herein, once the channel estimation is determined, the cell quality measurements of RSSI, RSRP, and noise variance may be considered as simple mathematical expressions described herein. Optimization in hardware and fixed point for the determination of RSSI, RSRP, and noise variance may be utilized to minimize the area and power consumption of this hardware.

After the estimation operations have been performed, scale and log stage module 830 may use the estimated RSSI, estimated signal power, and estimated noise variance to convert the RSRP, RSRQ, SINR, and noise variance estimates to the dB scale. Dynamic scaling may be performed first and then the scaled values may be converted to a logarithmic value. The linear scale estimates may be converted to the log scale through a dedicated logarithmic hardware. The log function is implemented through a series expansion where only three terms are considered. Optimized word-lengths are considered within the log implementation. Various scaling factors in the linear domain (such as M, K, and $L_{AVG}$) may be computed by subtraction in the log domain. Dynamic scaling may be applied for various linear estimates to properly utilize the smallest dynamic range in the log evaluation.

FIGS. 9, 10, and 11 illustrate estimations of performance of embodiments of the present disclosure under different channel environments, such as with different error margins or different processing times. The performance of the cell quality measurement operations described herein may be characterized under a plurality of channel environments to calculate the cell quality measurements accuracy and guarantee its matching one or more objectives, such as a particular error margin or processing time.

FIG. 9 illustrates an exemplary graph 900 of NSSS SNR estimation performance in accordance with one or more embodiments of the present disclosure.

The graph of FIG. 9 depicts a NSSS SNR estimation performance of various embodiments described herein for a detection probability of a NSSS based on a SNR. The graph depicts the detection probability of a NSSS for four differing error margins: 1 dB, 2 dBs, 3 dBs, and 4 dBs. For all error margins, as the SNR increases the detection probability of NSSS goes to 100%. As depicted, the highest detection probability is for the largest error margin of 4 dBs. The second highest detection probability is for the second largest error margin of 3 dBs. The third highest detection probability is for the third largest error margin of 2 dBs. The lowest detection probability is for the smallest error margin of 1 dB. As depicted, at a SNR of −15 dB, the probability detection with an error margin of 3 dB and 4 dB exceeds a 95% detection probability of a NSSS, including reaching a near 100% detection probability.

FIG. 10 illustrates an exemplary graph 1000 of NRS SNR estimation performance in accordance with one or more embodiments of the present disclosure.

The graph of FIG. 10 depicts a NRS SNR estimation performance of various embodiments described herein for a detection probability of a NRS based on a SNR. The graph depicts the detection probability of NRS for four differing error margins: 2 dBs, 3 dBs, 4 dBs, and 5 dBs. For all error margins, as the SNR increases the detection probability of NRS goes to 100%. As depicted, the highest detection probability is for the largest error margin of 5 dBs. The second highest detection probability is for the second largest error margin of 4 dBs. The third highest detection probability is for the third largest error margin of 3 dBs. The lowest detection probability is for the smallest error margin of 2 dBs. As depicted, the error margin of 5 dBs allows for an probability detection of NRS at a SNR of −8 dB, with other error margins requiring higher SNR before reaching a probability detection of 95%.

FIG. 11 illustrates an exemplary graph 1100 of CRS SNR estimation performance in accordance with one or more embodiments of the present disclosure.

The graph of FIG. 11 depicts a CRS SNR estimation performance with an error margin of 2 dBs for various embodiments described herein for a detection probability of a CRS based on a SNR. The graph depicts the detection probability for six differing processing times: 1 msec, 2 msec, 4 msec, 8 msec, 16 msec, and 32 msec. For all processing times, as the SNR increases the detection probability goes to 100%. As depicted, the highest detection probability is for the processing time 32 msec. The second highest detection probability is for the second largest processing time of 16 msec. The third highest detection probability is for the third largest processing time of 8 msec. The fourth highest detection probability is for the fourth largest processing time of 4 msec. The fifth highest detection probability is for the fifth largest processing time of 2 msec. The lowest detection probability is for the smallest processing time of 1 msec.

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this specification contains many specific embodiment and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are illustrated in the drawings in a particular order, this should not be understood as requiring that such operations be performed in the particular order shown or in sequential order, or that all illustrated operations be performed, to achieve desirable results. In certain circumstances, operations in alternative ordering may be advantageous. In some cases, the actions recited in the claims may be performed in a different order and still achieve desirable results.

Thus, while particular embodiments of the subject matter have been described, other embodiments are within the scope of the following claims.

While this detailed description has set forth some embodiments of the present disclosure, the appended claims may cover other embodiments of the present disclosure which differ from the described embodiments according to various modifications and improvements.

Within the appended claims, unless the specific term "means for" or "step for" is used within a given claim, it is not intended that the claim be interpreted under 35 U.S.C. § 112, paragraph (f).

The invention claimed is:

1. A user equipment comprising:
an antenna;
a modem for a cellular internet of things (IoT) network, wherein the modem is configured to:
receive, at the modem from the antenna, a first cellular signal from a first cell of one or more cells;
convert, at the modem, the first cellular signal to a first frequency domain signal;
generate, based on the first frequency domain signal, a first channel estimation and a first Received Signal Strength Indicator (RSSI), wherein generating the first channel estimation is based on a least squares estimation, a smoothing channel filter, and a time-domain average; and
determine, based on the first channel estimation, a first noise variance, a first Reference Signal Received Power (RSRP), a first Reference Signal Received Quality (RSRQ), and a first Signal-to-Interference plus Noise Ratio (SINR).

2. The user equipment of claim 1, wherein the modem is further configured:
select the first cell based on the first RSRP, the first RSRQ, and the first SINR.

3. The user equipment of claim 1, wherein the modem, to generate the first channel estimation based on the least squares estimation, the smoothing channel filter, and the time-domain average, is further configured to:
determine the least squares estimation based on the first frequency domain signal;
apply the smoothing channel filter to the least squares estimation to generate a smoothed least squares estimation; and
time-domain average the smoothed least squares estimation to generate the first channel estimation.

4. The user equipment of claim 1, wherein the modem, to determine, based on the first channel estimation, the first noise variance, the first RSRP, the first RSRQ, and the first SINR, is further configured to:
  determine, based on the first channel estimation and the first frequency domain signal, the first noise variance;
  determine, based on the first channel estimation, the first RSRP;
  determine, based on the first RSSI and the first RSRP, the first RSRQ; and
  determine, based on the first noise variance and the first RSRP, the first SINR.

5. The user equipment of claim 1, wherein the modem is further configured to:
  receive, at the modem from the antenna, a second cellular signal from a second cell;
  convert, at the modem, the second cellular signal from the second cell to a second frequency domain signal;
  determine, based on the second frequency domain signal, a second channel estimation and a second RSSI;
  determine, based on the second frequency domain signal and the second channel estimation, a second noise variance;
  determine, based on the second channel estimation, a second RSRP;
  determine, based on the second RSSI and the second RSRP, a second RSRQ; and
  determine, based on the second noise variance and the second RSRP, a second SINR.

6. The user equipment of claim 5, wherein the modem is further configured to:
  perform a cell reselection process based on the first RSRP, the first RSRQ, the first SINR, the second RSRP, the second RSRQ, and the second SINR.

7. The user equipment of claim 6, wherein the modem, to perform a cell reselection process, is further configured to:
  rank the first cell and second cell based on the first RSRP, the first RSRQ, the first SINR, the second RSRP, the second RSRQ, and the second SINR; and
  select a highest rank cell of the first cell and the second cell.

8. The user equipment of claim 1, wherein the modem, to apply a smoothing channel filter to the least squares estimation, is further configured to:
  segment the least squares estimation into a plurality of segments; and
  apply the smoothing channel filter to each segment of the plurality of segments.

9. The user equipment of claim 1, wherein the modem is a narrow-band IoT (NBIOT) modem.

10. The user equipment of claim 1, wherein the modem is a machine type communication (MTC) modem.

11. A method for determining cell quality measurements, the method comprising:
  receiving, at a modem, a first cellular signal from a first cell of one or more cells;
  converting, at the modem, the first cellular signal from the first cell to a first frequency domain signal;
  generating, based on the first frequency domain signal, a first channel estimation and a first Received Signal Strength Indicator (RSSI), wherein generating the first channel estimation is based on a least squares estimation, a smoothing channel filter, and a time-domain average;
  determining, based on the first channel estimation, a first noise variance, a first Reference Signal Received Power (RSRP), a first Reference Signal Received Quality (RSRQ), and a first Signal-to-Interference plus Noise Ratio (SINR).

12. The method of claim 11 further comprising:
  selecting the first cell based on the first RSRP, the first RSRQ, and the first SINR.

13. The method of claim 11, wherein generating, based on the first frequency domain signal, a first channel estimation and a first RSSI, wherein determining the first channel estimation is based on a least squares estimation, a smoothing channel filter, and a time-domain average comprises:
  determining a least squares estimation based on the first frequency domain signal;
  applying a smoothing channel filter to the least squares estimation to generate a smoothed least squares estimation;
  time-domain averaging the smoothed least squares estimation to generate the first channel estimation.

14. The method of claim 11, wherein determining, based on the first channel estimation, the first noise variance, the first RSRP, the first RSRQ, and the first SINR comprises:
  determining, based on the first channel estimation and the first frequency domain signal, the first noise variance;
  determining, based on the first channel estimation, the first RSRP;
  determining, based on the first RSSI and the first RSRP, the first RSRQ; and
  determining, based on the first noise variance and the first RSRP, the first SINR.

15. The method of claim 11 further comprising:
  receiving, at the modem, a second cellular signal from a second cell;
  converting, at the modem, the second cellular signal from the second cell to a second frequency domain signal;
  determining, based on the second frequency domain signal, a second channel estimation and a second RSSI;
  determining, based on the second frequency domain signal and the second channel estimation, a second noise variance;
  determining, based on the second channel estimation, a second RSRP;
  determining, based on the second RSSI and the second RSRP, a second RSRQ; and
  determining, based on the second noise variance and the second RSRP, a second SINR.

16. The method of claim 15 further comprising:
  performing a cell reselection process based on the first RSRP, the first RSRQ, the first SINR, the second RSRP, the second RSRQ, and the second SINR.

17. The method of claim 16, wherein performing the cell reselection process comprises:
  ranking the first cell and second cell based on the first RSRP, the first RSRQ, the first SINR, the second RSRP, the second RSRQ, and the second SINR; and
  selecting a highest rank cell of the first cell and the second cell.

18. The method of claim 11, wherein applying a smoothing channel filter to the least squares estimation comprises:
  segmenting the least squares estimation into a plurality of segments; and
  applying the smoothing channel filter to each segment of the plurality of segments.

19. The method of claim 11, wherein the modem is a narrow-band IoT (NBIOT) modem or a machine type communication (MTC) modem.

20. A modem comprising at least one processor and at least one memory coupled to the at least one processor, wherein the at least one processor is configured to:
  receive, at the modem from an antenna, a first cellular signal from a first cell of one or more cells;

convert, at the modem, the first cellular signal to a first frequency domain signal;

generate, based on the first frequency domain signal, a first channel estimation and a first Received Signal Strength Indicator (RSSI), wherein generating the first channel estimation is based on a least squares estimation, a smoothing channel filter, and a time-domain average; and determine, based on the first channel estimation, a first noise variance, a first Reference Signal Received Power (RSRP), a first Reference Signal Received Quality (RSRQ), and a first Signal-to-Interference plus Noise Ratio (SINR).

* * * * *